US012437341B2

(12) United States Patent
Gross et al.

(10) Patent No.: US 12,437,341 B2
(45) Date of Patent: Oct. 7, 2025

(54) PARAMETRIC ENGINE TO IMPLEMENT METHODS USING PARAMETRIC ANALYTICS

(71) Applicant: STATE FARM MUTUAL AUTOMOBILE INSURANCE COMPANY, Bloomington, IL (US)

(72) Inventors: Ryan Michael Gross, Normal, IL (US); M Eric Riley, Sr., Heyworth, IL (US); Jody Ann Thoele, Bloomington, IL (US); Jordan Jeffers, Normal, IL (US); Shawn Renee Harbaugh, Normal, IL (US); Rick Lovings, Normal, IL (US); Joann C. Yant, Bloomington, IL (US); Jenny L. Jacobs, Normal, IL (US); Erik Skyten, Harriman, TN (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 233 days.

(21) Appl. No.: 17/962,816

(22) Filed: Oct. 10, 2022

(65) Prior Publication Data

US 2024/0062306 A1 Feb. 22, 2024

Related U.S. Application Data

(60) Provisional application No. 63/398,750, filed on Aug. 17, 2022.

(51) Int. Cl.
*G06Q 40/08* (2012.01)
(52) U.S. Cl.
CPC .................................. *G06Q 40/08* (2013.01)

(58) Field of Classification Search
CPC ........................................................ G06Q 40/08
USPC ............................................................... 705/4
See application file for complete search history.

(56) References Cited

U.S. PATENT DOCUMENTS

| 11,810,200 | B1 * | 11/2023 | Meyer | G06Q 50/22 |
| 2003/0119585 | A1 * | 6/2003 | Walker | G06Q 40/08 463/25 |
| 2013/0096954 | A1 * | 4/2013 | Bodas | G06Q 40/08 705/4 |
| 2018/0322123 | A1 * | 11/2018 | Cousins | G06F 16/284 |
| 2021/0366053 | A1 * | 11/2021 | Gujral | G06Q 40/08 |
| 2023/0342861 | A1 | 10/2023 | LeFebre et al. | |

(Continued)

FOREIGN PATENT DOCUMENTS

WO WO-2018222759 A1 * 12/2018

*Primary Examiner* — William E Rankins
(74) *Attorney, Agent, or Firm* — MARSHALL, GERSTEIN & BORUN LLP

(57) ABSTRACT

Systems and methods are described for performing analysis of parametric events. The method may include: (1) receiving weather data from a weather oracle network; (2) calculating, using a first trained machine learning algorithm, a likelihood of a trigger activation for a parametric event (or a trigger event) for a user based at least upon the weather data; (3) calculating, using a second trained machine learning algorithm, an estimated loss for the user based at least upon the likelihood of the trigger activation; (4) determining an initial coverage for the user; and (5) determining whether to offer the user updated coverage for the parametric event based at least upon a comparison of the initial coverage and the estimated loss for the user.

18 Claims, 7 Drawing Sheets

(56) References Cited

U.S. PATENT DOCUMENTS

2023/0351340 A1 11/2023 LeFebre et al.
2023/0351379 A1 11/2023 LeFebre et al.
2023/0351380 A1 11/2023 LeFebre et al.

* cited by examiner

PARAMETRIC ENGINE TO IMPLEMENT METHODS USING PARAMETRIC ANALYTICS

CROSS REFERENCE TO RELATED APPLICATIONS

This application claims the benefit of (1) U.S. Provisional Patent Application No. 63/398,750, entitled "Parametric Engine to Implement Methods Using Parametric Analytics," filed Aug. 17, 2022. U.S. Provisional Patent Application No. 63/398,750 is hereby expressly incorporated by reference herein in its entirety.

FIELD OF THE DISCLOSURE

Systems and methods are disclosed for using a parametric engine for implementing a methods of parametrically analyzing future events, determining a likelihood of damage, and/or determining whether to update a coverage for damage for a user.

BACKGROUND

Weather events and other, similar parametric events may cause damages to the livelihoods or properties for individuals, such as farmers, vehicle owners, homeowners, etc. As such, to protect the interests of individuals for whom parametric events may cause damages, a user may seek coverage for potential damages. However, traditional methods for protecting a user against future parametric damages are vulnerable to uncertainty and change factors that may render such coverage unnecessary or insufficient. Conventional techniques may have additional drawbacks as well.

SUMMARY

The present embodiments may relate to systems and methods for accurately, securely, efficiently implementing methods using parametric analysis on a parametric engine capable of forward-looking determinations. In certain embodiments, weather and/or other data may be stored on a distributed ledger, a trigger, trigger event, and/or parametric event may be determined from processor analysis of the weather and/or other data, and as a result, one or more payments may be made, such in accordance with one or more smart contracts. In general, the triggers, trigger events, and/or parametric events discussed herein may relate to weather events, and/or weather more generally in specific areas or fields, that may impact negatively (or positively) crops or crop yields (such as lack of rain, heavy down pours, high winds, tornados, hail, early frost or snow in the fall, late frost or snow in the spring, etc.). Machine learning algorithms may be utilized to verify or enhance the accuracy of the trigger or parametric event determination.

In one aspect, a computer-implemented method for performing analysis of parametric events may be provided. The method may be implemented via one or more local or remote processors, servers, sensors, transceivers, memory units, and/or other electronic or electrical components. The method may include: (1) receiving, by one or more processors, weather data from a weather oracle network; (2) calculating, by the one or more processors and using a first trained machine learning algorithm, a likelihood of a trigger activation for a parametric event (or a trigger event) for a user based at least upon the weather data; (3) calculating, by the one or more processors and using a second trained machine learning algorithm, an estimated loss for the user based at least upon the likelihood of the trigger activation; (4) determining, by the one or more processors, an initial coverage for the user; and/or (5) determining, by the one or more processors, whether to offer the user updated coverage for the parametric event based at least upon a comparison of the initial coverage and the estimated loss for the user. The updated coverage may include at least one of: (i) a discount on the initial coverage; (ii) an increase in value of the initial coverage; or (iii) an increase in scope of the initial coverage. Similarly, the receiving the weather data may further comprise receiving the weather data from at least one of: (i) a distributed ledger, (ii) an Application Programming Interface (e.g., of a synthetic aperture radar, etc.), or (iii) user comment databases. The method may include additional, fewer, or alternative actions, including those discussed elsewhere herein.

For instance, in some embodiments, the method may include (i) receiving confirmation data associated with the parametric event; (ii) authenticating, based at least upon the confirmation data, that the user suffered a loss associated with the parametric event; and/or (iii) causing the user to receive a payment in accordance with at least one of the initial coverage or the additional coverage.

In further embodiments, the weather data may include unstructured weather data, and the method may further include (a) extracting the unstructured weather data; and/or (b) analyzing the unstructured weather data using natural language processing (NLP).

In certain embodiments, the method may include: (i) receiving updated weather data from one or more smart devices located at a location of the parametric event; and/or (ii) determining an updated estimated loss based at least on the estimated loss and the updated weather data. Determining whether to offer the user the updated coverage may be further based upon the updated estimated loss.

In further embodiments, calculating the likelihood of the trigger activation for the parametric event may include: (i) determining an amount of precipitation for a time period based at least upon the weather data; (ii) determining a predicted total water fluctuation for the time period based upon the amount of precipitation for the time period; and/or (iii) calculating the likelihood of the trigger activation based upon the predicted total water fluctuation.

In another aspect, a computing system for generating a zero-trust index mutual aid on a distributed ledger may be provided. The computing device may include: a memory storing a set of computer-executable instructions; and one or more processors (and/or associated sensors and transceivers) interfacing with the memory, and configured to execute the computer-executable instructions to cause the one or more processors to: (1) receive weather data from a weather oracle network; (2) calculate, using a first trained machine learning algorithm, a likelihood of a trigger activation for a parametric event (or a trigger event) for a user based at least upon the weather data; (3) calculate, using a second trained machine learning algorithm, an estimated loss for the user based at least upon the likelihood of the trigger activation; (4) determine an initial coverage for the user; and/or (5) determine whether to offer the user updated coverage for the parametric event based at least upon a comparison of the initial coverage and the estimated loss for the user. The updated coverage may include at least one of: (i) a discount on the initial coverage; (ii) an increase in value of the initial coverage; or (iii) an increase in scope of the initial coverage. Similarly, the receiving the weather data may further include receiving the weather data from at least one of: (i) a distributed ledger, (ii) an Application Programming Interface (e.g., of a synthetic aperture radar, etc.), or (iii) user comment databases. The computing device may include additional, less, or alternate functionality, including that discussed elsewhere herein.

For instance, in some embodiments, the memory may further store instructions that, when executed by the one or more processors, cause the computing system to: (a) receive confirmation data associated with the parametric event; (b) authenticate, based at least upon the confirmation data, that the user suffered a loss associated with the parametric event; and/or (c) cause the user to receive a payment in accordance with at least one of the initial coverage or the additional coverage.

In some embodiments, the weather data may include unstructured weather data, and the memory may further store instructions that, when executed by the one or more processors, cause the computing system to: (i) extract the unstructured weather data; and/or (ii) analyze the unstructured weather data using natural language processing (NLP).

In certain embodiments, the memory may further store instructions that, when executed by the one or more processors, cause the computing system to: (i) receive updated weather data from one or more smart devices located at a location of the parametric event; and/or (ii) determine an updated estimated loss based at least on the estimated loss and the updated weather data. Determining whether to offer the user the updated coverage may be further based upon the updated estimated loss.

In further embodiments, the calculating the likelihood of the trigger activation for the parametric event may include: (i) determining an amount of precipitation for a time period based at least upon the weather data; (ii) determining a predicted total water fluctuation for the time period based upon the amount of precipitation for the time period; and/or (iii) calculating the likelihood of the trigger activation based upon the predicted total water fluctuation.

In another aspect, a tangible, non-transitory computer-readable medium storing instructions for generating a zero-trust index mutual aid on a distributed ledger may be provided. The instructions may be executed via one or more local or remote processors, servers, sensors, transceivers, memory units, and/or other electronic or electrical components. The instructions may include instructions that, when executed by one or more processors of a computing device, cause the computing device to: (1) receive weather data from a weather oracle network; (2) calculate, using a first trained machine learning algorithm, a likelihood of a trigger activation for a parametric event for a user based at least upon the weather data; (3) calculate, using a second trained machine learning algorithm, an estimated loss for the user based at least upon the likelihood of the trigger activation; (4) determine an initial coverage for the user; and/or (5) determine whether to offer the user updated coverage for the parametric event based at least upon a comparison of the initial coverage and the estimated loss for the user. The updated coverage may include at least one of: (i) a discount on the initial coverage; (ii) an increase in value of the initial coverage; or (iii) an increase in scope of the initial coverage. Similarly, the receiving the weather data may further include receiving the weather data from at least one of: (i) a distributed ledger, (ii) an Application Programming Interface (e.g., of a synthetic aperture radar, etc.), or (iii) user comment databases. The tangible, non-transitory computer-readable medium may store instructions with additional, less, or alternate functionality, including those discussed elsewhere herein.

For instance, in some embodiments, the tangible, non-transitory computer-readable medium may further store instructions that, when executed by the one or more processors, cause the computing device to: receive confirmation data associated with the parametric event; authenticate, based at least upon the confirmation data, that the user suffered a loss associated with the parametric event; and/or cause the user to receive a payment in accordance with at least one of the initial coverage or the additional coverage.

In some embodiments, the weather data may include unstructured weather data, and the tangible, non-transitory computer-readable medium may further store instructions that, when executed by the one or more processors, cause the computing system to: (i) extract the unstructured weather data; and/or (ii) analyze the unstructured weather data using natural language processing (NLP).

In certain embodiments, the tangible, non-transitory computer-readable medium may further store instructions that, when executed by the one or more processors, cause the computing system to: (a) receive updated weather data from one or more smart devices located at a location of the parametric event; and/or (b) determine an updated estimated loss based at least on the estimated loss and the updated weather data. Determining whether to offer the user the updated coverage may be further based upon the updated estimated loss.

In further embodiments, the calculating the likelihood of the trigger activation for the parametric event may include: (i) determining an amount of precipitation for a time period based at least upon the weather data; (ii) determining a predicted total water fluctuation for the time period based upon the amount of precipitation for the time period; and/or (iii) calculating the likelihood of the trigger activation based upon the predicted total water fluctuation.

This summary is provided to introduce a selection of concepts in a simplified form that are further described in the Detailed Descriptions. This summary is not intended to identify key features or essential features of the claimed subject matter, nor is it intended to be used to limit the scope of the claimed subject matter.

Advantages will become more apparent to those of ordinary skill in the art from the following description of the preferred aspects, which have been shown and described by way of illustration. As will be realized, the present aspects may be capable of other and different aspects, and their details are capable of modification in various respects. Accordingly, the drawings and description are to be regarded as illustrative in nature and not as restrictive.

Figure 1:
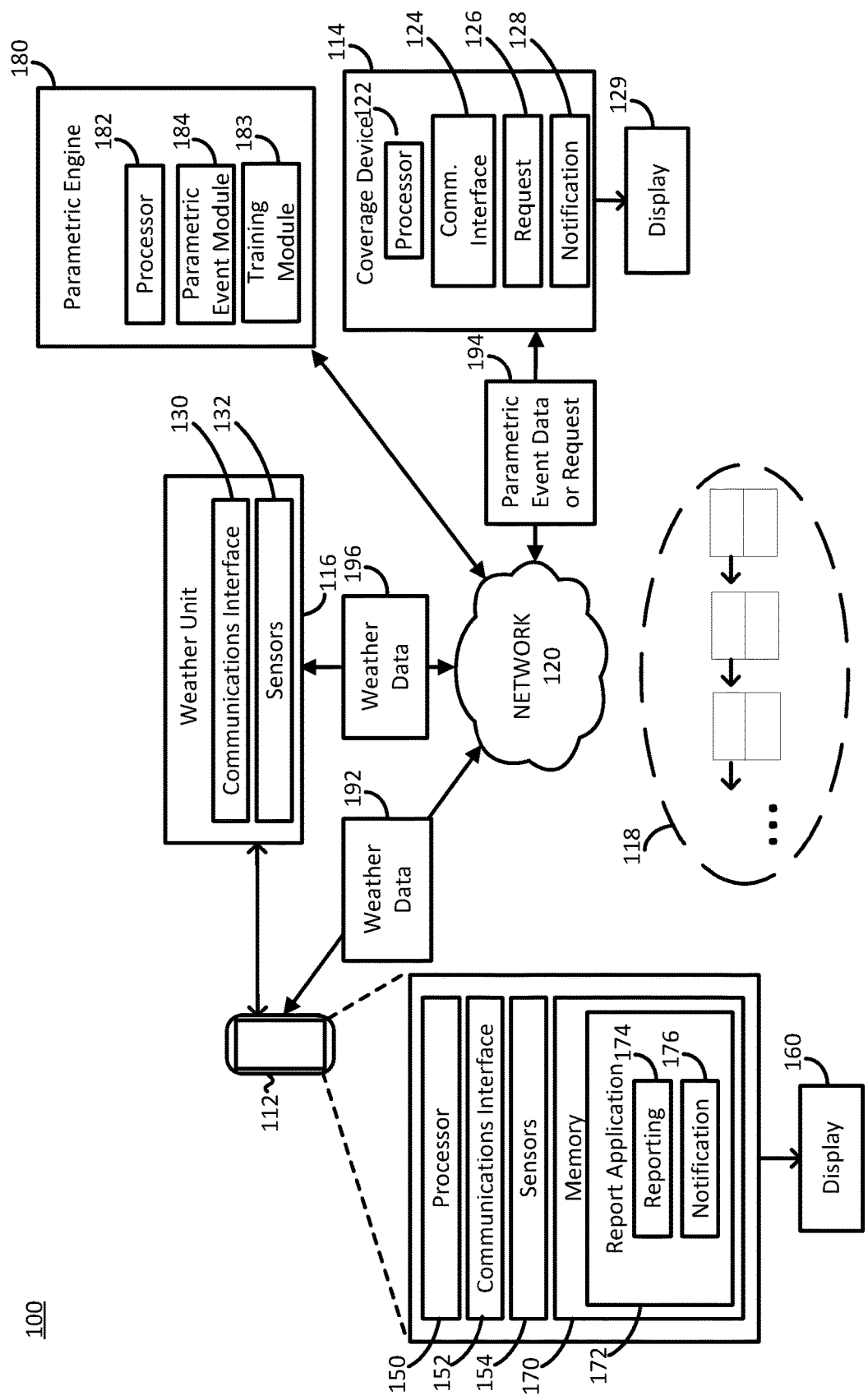
FIG. 1 depicts an exemplary computing system that facilitates using a parametric engine to look forward and determine a likelihood of damage for the user, determine whether a current coverage for user damage will be exceeded, and/or confirm whether a parametric event has happened, in accordance with one aspect of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Techniques, systems, apparatuses, components, devices, and methods are disclosed for, inter alia, utilizing a distributed ledger, or blockchain, to generate and/or maintain a zero-trust index mutual aid. For example, a distributed ledger may be maintained by nodes, such as computing devices associated with weather oracles, federal weather organizations, state weather organizations, amateur weather groups, regulatory organizations, insurance companies, farmers, farming companies, and/or other organizations involved in evaluating a level of risk, sensing or predicting the weather, and/or performing events or actions that risk damage by potential weather events, such as farming. The nodes may receive transactions broadcasted to a distributed ledger network from weather units within weather sensing devices communicatively coupled to the network.

More specifically, the weather data may include data regarding temperature, weather patterns, weather pattern predictions, local weather, distant weather, general weather, temporally recent weather, historical weather, climate information, recent changes to climate, long-term changes to climate, sensor data, amateur weather data, professional weather data, natural language comments on weather, etc.

In further embodiments, the computing system may receive additional data, such as parametric event data (or trigger event data, the trigger event triggering certain activity, such as an automatic payout). In some such embodiments, the parametric event data may include trigger data, coverage data, payout data, location data for a location that may be affected by the parametric event, property data for property that may be affected by the parametric event, user data for a user that may be affected by the parametric event, etc.

In some embodiments, the parametric event may be a particular weather event (e.g., a rainfall of greater than 2 inches in an hour, a hail storm, a tornado, high winds, heavy down pour, etc.), a general weather event (e.g., a spate of unseasonably cold weather for a week; prolonged drought, lack of rain during a certain time period (such as during July or August, or during pollination), etc.), a general status event (e.g., a failure of a field of crops, or below average yields for one or more fields), another type of parametric event (e.g., a chemical composition change in soil contents), etc. Similarly, depending on the embodiment, the trigger event may be a particular measurable threshold (e.g., 2 inches of rainfall in an hour or less, hail for 15 minutes, high winds for 20 minutes, etc.), a particular calculated threshold (e.g., a 50% chance of failure for a field, 20% estimated crop yield loss (such as due to lack of rain during and after pollination), an indicative flag (e.g., detecting that snow has fallen or a frost has occurred during the early or late growing season—damaging the crop, leading to crop loss, or ending the growing season prematurely), or any other similar trigger, including those discussed elsewhere herein.

The computing system may receive weather data at a distributed ledger that includes a parametric engine as a node. The parametric engine may then use the weather data to calculate the likelihood of whether a trigger for a parametric event will be met. In some embodiments, the parametric engine may determine that the trigger for the parametric event will be met using a machine learning algorithm. In further embodiments, the parametric engine then may calculate an estimated loss for the user based upon the likelihood of the trigger activating. Depending on the embodiment, the parametric engine may determine an initial coverage for the user and, using the initial coverage and the estimated loss for the user, determine whether to offer updated coverage for the user. The parametric engine may also make the determination using updated weather data from smart devices placed around the particular location. Similarly, the parametric engine may make a post-event determination rather than a forward-looking determination.

Depending on the embodiment, the parametric engine may retrieve the weather data from the blockchain, directly from a node on the blockchain, etc. The parametric engine may then determine and/or verify the details during a time period in which the parametric event allegedly occurred or will likely occur. In some embodiments, the parametric engine may authenticate the parametric event based upon an assessment of risk from a third party (e.g., a non-user entity on the blockchain).

Still further, the parametric engine may utilize distributed ledgers to execute smart contracts, described in more detail below. An organization involved in generating updated coverage or paying out a settlement quote may deploy a smart contract to the distributed ledger to confirm the updated coverage and/or generate a payment based upon the weather data.

The parametric engine may be an improvement over traditional methods for analyzing such data at least through improvements by utilizing a wider array of previously unused data types. Similarly, the parametric engine may receive unstructured data and extract usable data for analytics, thereby further improving the accuracy and range of usable data. The parametric engine may also use machine learning algorithms to more accurately analyze the data in question. Moreover, the parametric engine may use nested machine learning algorithms to further improve the functionality of the system by normalizing an input so that the parametric engine may analyze the inputs collectively (e.g., in the case of unstructured weather data) and/or by improving the accuracy of a predicted event used in performing the calculation for the estimated loss.

By utilizing distributed ledgers and, in some scenarios, smart contracts to record weather data and determine whether to offer updated coverage, verifies whether a parametric event happened or will happen, determines the likelihood of a trigger of a parametric event activating, and/or calculates an estimated loss, a system may provide a trusted, secure, and immutable record of the weather data. The secure, immutable, and trustless nature of distributed ledgers is particularly important to reduce fraud in a largely automated system by preventing gaming of the system.

The parametric engine may be used to implement techniques of other ideas as well as other parametric insurance techniques. In particular, the parametric engine may use machine learning and/or artificial intelligence (AI) to perform analytics for parametric insurance methodologies and/or techniques. As such, the parametric engine may train algorithms that determine whether an event occurred to the threshold necessary for a payout to trigger. The parametric engine further may analyze a wider range of data. For example, the parametric engine may utilize techniques such as natural language processing (NLP) to extract unstructured data in weather data sets or distributed weather oracle networks and/or ledgers to obtain an increased range of data points from which to make such a decision. The parametric engine further may make use of the machine learning and/or AI to automatically make a greater range of decisions, such as when to offer additional coverage and/or confirm a loss of an insured. Moreover, the parametric engine may provide greater security and transparency by utilizing a distributed ledger in retrieving information and making determinations.

A blockchain (also referred to herein as a distributed ledger or a shared ledger) is a storage mechanism for data, events, transactions, etc. that several participants maintain. More specifically, a distributed ledger is a way of achieving a distributed consensus on the validity or invalidity of information in the distributed ledger. In other words, the blockchain may provide a decentralized trust to participants and observers. As opposed to relying on a central authority, a blockchain is a decentralized database in which each node of a peer-to-peer network maintains and validates a transactional record of changes to the ledger. The distributed ledger is comprised of groupings of transactions organized together into a "block," and ordered sequentially (hence the term "blockchain"). While the distributed ledgers discussed herein are referred to in the context of a blockchain, this is merely one example of a distributed ledger. Distributed ledgers may also include a tangle, a block lattice, or other directed acyclic graph (DAG). In any event, nodes may join and leave the blockchain network over time and may obtain blocks that were propagated while the node was gone from peer nodes. Nodes may maintain addresses of other nodes and exchange addresses of known nodes with one another to facilitate the propagation of new information across the network in a decentralized, peer-to-peer manner.

The nodes that share the ledger form what is referred to herein as the distributed ledger network, distributed weather data ledger, weather ledger, etc. The nodes in the distributed ledger network may validate changes to the blockchain (e.g., when a new transaction and/or block is created) according to a set of consensus rules. The consensus rules depend on the information being tracked by the blockchain and may include rules regarding the chain itself. For example, a consensus rule may include that the originator of a change supply a proof-of-identity such that only approved entities may originate changes to the chain. A consensus rule may require that blocks and transactions adhere to format requirement and supply certain meta information regarding the change (e.g., blocks must be below a size limit, transactions must include a number of fields, etc.). Consensus rules may include a mechanism to determine the order in which new blocks are added to the chain (e.g., through a proof-of-work system, proof-of-stake, etc.).

Additions to the blockchain that satisfy the consensus rules may be propagated from nodes that have validated the addition to other nodes of which the validating node is aware. If all the nodes that receive a change to the blockchain validate the new block, then the distributed ledger may reflect the new change as stored on all nodes, and it may be said that distributed consensus has been reached with respect to the new block and the information contained therein. Validating nodes that receive any change that does not satisfy the consensus may disregard the change and do not propagate the change to other nodes. Accordingly, unlike a traditional system which uses a central authority, a single party cannot unilaterally alter the distributed ledger unless the single party can do so in a way that satisfies the consensus rules. The inability to modify past transactions leads to blockchains being generally described as trusted, secure, and immutable. Therefore, blockchains may remove potential attack vectors for tampering with the weather and/or parametric event data, such as those inherent in a centralized database maintained by an organization involved in determining the level of risk for a user.

The validation activities of nodes applying consensus rules on a blockchain network may take various forms. In one embodiment, the blockchain may appear as a shared spreadsheet that tracks data such as the weather and/or parametric data. In another embodiment, the validating nodes execute code contained in "smart contracts" and distributed consensus may be expressed as the network nodes agreeing on the output of the executed code.

A smart contract is a computer protocol that enables the automatic execution and/or enforcement of an agreement between different parties. In particular, the smart contract may be computer code located at a particular address on the blockchain. In some cases, the smart contract may run automatically in response to a participant in the blockchain sending funds (e.g., a cryptocurrency such as bitcoin, ether, or other digital/virtual currency) to the address where the smart contract is stored. Additionally, smart contracts may maintain a balance of the amount of funds stored at the address. In some scenarios when the balance reaches zero, the smart contract may no longer be operational.

The smart contract may include one or more trigger conditions, that, when satisfied, may correspond to one or more actions. For some smart contracts, the system may determine to perform action(s) based upon one or more decision conditions. In some instances, the system routes data streams to the smart contract so that the smart contract may detect that a trigger condition has occurred and/or analyze a decision condition.

The computing system may deploy blockchains in a public, decentralized, and permissionless manner, meaning that any party may view the shared ledger, submit new information to be added to the ledger, or join the network as a validating node. Other blockchains may be private (e.g., permissioned ledgers) and keep chain data private among a group of entities authorized to participate in the blockchain network.

The present embodiments relate to computing systems and computer-implemented methods for using a blockchain to record and manage information related to weather data and/or parametric event data. The blockchain may be either a public or permissioned ledger.

Exemplary Distributed Ledger for Calculating Risk, Detecting an Event Trigger, and/or Authenticating a Parametric Event FIG. 1 depicts an exemplary computing system 100 for using a parametric engine to look forward and determine a likelihood of damage for the user, determine whether a current coverage for user damage will be exceeded, and/or confirm whether a parametric event has happened in accordance with various aspects of the present disclosure. An entity (e.g., connected to the network 120 via a coverage device 114), such as a user, may risk suffering a loss associated with a parametric event and subsequently wish to be protected in case of such a loss. Additionally, a weather unit (e.g., weather unit 116) and/or one or more mobile devices (e.g., mobile device 112) may detect and store weather data associated with the parametric event. The distributed ledger system 100 may include a blockchain 118 accessible by network participants via a network 120 (e.g., a private or public packet switched network) as described in more detail herein.

The weather unit 116 may transmit weather data in transactions 196 to the blockchain 118. Further, though FIG. 1 only depicts weather data in transactions 196, the weather unit 116 may further transmit unstructured data in transactions 196, alongside, in place of, or separately from structured weather data. Depending on the embodiment, the weather unit 116 may be or include weather sensors, a distributed weather oracle, one or more smart devices configured to gather weather data, a weather organization database, etc.

In embodiments in which the weather data is or includes unstructured weather data, the weather unit 116 may be a chatroom, website, blog, or other similar collection of natural language weather data. In such implementations, the system 100 and/or a parametric engine 180 in the system 100 may use optical character recognition (OCR), natural language processing (NLP), and/or other such techniques to analyze the unstructured weather data. Additionally or alternatively, one or more mobile devices (e.g., mobile device 112) communicatively coupled to the weather unit 116 may transmit structured and/or unstructured weather data in transactions 192 to the blockchain 118.

In some embodiments, the weather unit 116 may include additional devices (e.g., internet of things (IoT) devices or smart devices) that measure localized weather data around a particular location. In such embodiments, a user or another party, such as an insurance company or underwriter, may place the additional devices around the location to receive updated weather data for a particular location and/or time period. For example, if a user is hosting an outside activity such as a golfing tournament, or if a user has an outside recreational device such as a pool, an insurance company can place the additional devices in the location to maintain a stream of updated weather data for the particular location.

The weather unit 116 may include a processor, a set of one or several sensors 132, and/or a communication interface 130. The set of sensors 132 may include, for example, a barometer, a temperature and humidity (T&H) sensor, a wind speed sensor, a wind direction sensor, a rain gauge, a solar radiation sensor, a sunlight sensor, a UV sensor, a noise sensor, a rain/snow sensor, a negative ion sensor, an evaporation sensor, a soil moisture sensor, a soil nitrogen/phosphorus/potassium (NPK) sensor, a soil pH sensor, a leaf moisture sensor, etc. In further embodiments, the weather unit 116 may be a database, website, data log, etc. and connects to and/or receives data from external sensors instead. As such, although FIG. 1 depicts the set of sensors 132 inside the weather unit 116, it is noted that the sensors 132 need not be integral components of the weather unit 116.

The communication interface 130 may allow the weather unit 116 to communicate with the mobile device 112. The communication interface 130 may support wired or wireless communications, such as USB, Bluetooth, Wi-Fi Direct, Near Field Communication (NFC), etc. The communication interface 130 may allow the weather unit 116 to communicate with various content providers, servers, the blockchain network, etc., via a wireless communication network such as a fifth-, fourth-, or third-generation cellular network (5G, 4G, or 3G, respectively), a Wi-Fi network (802.11 standards), a WiMAX network, a wide area network (WAN), a local area network (LAN), etc. The processor may operate to format messages transmitted between the weather unit 116 and the mobile device 112, process data from the sensors 132, transmit transactions to the blockchain network, etc.

Mobile device 112 may be associated with (e.g., in the possession of, configured to provide secure access to, etc.) a particular user, who may be an individual or group that requires coverage in case of a parametric event and/or may be a user who records weather-related data, such as a storm chaser. In further embodiments, the mobile device 112 may be associated with an insurance company, underwriter, or agent of such. Mobile device 112 may be a personal computing device of that user, such as a smartphone, a tablet, smart glasses, or any other suitable device or combination of devices (e.g., a smart watch plus a smartphone) with wireless communication capability. In the embodiment of FIG. 1, mobile device 112 may include a processor 150, a communications interface 152, sensors 154, a memory 170, and a display 160. Processor 150 may include any suitable number of processors and/or processor types. Processor 150 may include one or more CPUs and one or more graphics processing units (GPUs), for example. Generally, processor 150 may be configured to execute software instructions stored in memory 170. Memory 170 may include one or more persistent memories (e.g., a hard drive and/or solid state memory) and may store one or more applications, including report application 172.

The mobile device 112 may be communicatively coupled to the weather unit 116. For example, the mobile device 112 and the weather unit 116 may communicate via USB, Bluetooth, Wi-Fi Direct, Near Field Communication (NFC), etc. For example, the weather unit 116 may send weather data, parametric event data, or other sensor data in the weather unit 116 via communications interface 130 and the mobile device 112 may receive the weather data, parametric event data, or other sensor data via communications interface 152.

In other embodiments, mobile device 112 may obtain the weather data from the weather unit 116 from sensors 154 within the mobile device 112. Further still, mobile device 112 may obtain the weather data via a user interaction with a display 160 of the mobile device 112. For example, a user may input information regarding weather data and/or a parametric event at the display 160. Reporting unit 174 may be configured to prompt a user to send temperature information and/or other weather data at the display 160. The mobile device 112 may then generate a transaction that may include the weather data and may transmit the transaction 192 to a blockchain network via communications interface 152.

In some embodiments, the report application 172 may be communicatively coupled to a weather and/or parametric event application. In such embodiments, the mobile device 112 may obtain the weather data and/or parametric event data via stored data in the application or via a notification 176 in the report application 172 granting the report application 172 access to the application data.

In some embodiments, the weather data may be interpretations of raw sensor data, such as detecting a parametric event when a sensor detects a threshold amount of precipitation. In further embodiments, the weather data may be raw, unstructured weather data, such as comments by a storm chaser or weather-related blog. In such embodiments, the system 100 may detect a parametric event and/or a trigger for a parametric event after analyzing the unstructured data, such as by using NLP at a parametric engine 180.

The sensors, computing devices, and/or components of the system 100 may collect and transmit weather to the parametric engine 180 and/or blockchain 118 in real-time (e.g., as the weather data is collected) or at least near real-time at each time interval in which the system 100 collects weather data. In other embodiments, sensors, computing devices, and/or components of the system 100 may collect a set of weather data at several time intervals over a time period (e.g., a day), and the weather unit 116 and/or mobile device 112 may generate and transmit a transaction which may include the set of weather data collected over the time period. Also, in some embodiments, the weather unit 116 and/or mobile device 112 may generate and transmit transactions periodically (e.g., every minute, every hour, every day), where each transaction may include a different set of weather data collected over the most recent time period. In other embodiments, the weather unit 116 and/or mobile device 112 may generate and transmit transactions as the weather unit 116 and/or mobile device 112 receive new weather data.

In further embodiments, the weather unit 116 may include a trusted party that may collect and transmit the weather data, such as a weather oracle. The weather oracles may be devices connected to the internet that record and/or receive information about the physical environment around them and/or devices connected to sensors, such as a weather unit 116, a mobile device 112, sensors 132, a weather forecasting server, an amateur storm chasing server, etc. The data may be packaged into a transaction, such as transaction 192 or 196. The data from the weather oracle may include a transaction ID, an originator (identified by a cryptographic proof-of-identity and/or a unique oracle ID), a data type (such as unstructured or structured data), and a cryptographic hash of the data. In another embodiment, the evidence may not be stored as a cryptographic hash, but may be directly accessible by an observer or other network participant.

Next, the weather unit 116 may generate a transaction 196 including a representation of the weather data. In some embodiments, the weather unit 116 may transmit the transaction 196 to the parametric engine 180, or may transmit the transaction 196 to be stored in the blockchain 118. When entities broadcast transactions to the blockchain 118, a proof-of-identity of the entity broadcasting the transaction may accompany the transaction. In one embodiment, the entity broadcasting the transactions may include a cryptographic proof-of-identity in transactions sent to the blockchain. For example, each of the entities 112 and 116 may own private cryptographic keys that are associated with public cryptographic keys known to belong to the entity (e.g., public cryptographic keys associated with each of the entities may be published by a trusted third party or proven to other network participants, etc.).

An entity wishing to broadcast a transaction to the blockchain 118 may sign a cryptographic message in the transaction with the entity's private cryptographic key to prove the identity of the entity broadcasting the transaction. In this way, other network participants may receive cryptographic proof that the participating entity originated the information contained in the broadcast transaction. Accordingly, generating the transaction 196 may include obtaining identity data for the weather unit 116, obtaining identity data for the mobile device 112 in the weather unit 116, and augmenting the transaction 196 with the identity data for the weather unit 116 and/or the mobile device 112. The transaction 196 may include the weather data or a cryptographic hash value corresponding to the weather data.

Next, the weather unit 116 may transmit, for example via communications interface 130, the transaction 196 to at least one other participant in a distributed ledger network of participants maintaining the distributed ledger. Additionally or alternatively, mobile device 112 may obtain weather data and generate a transaction 192, including a representation of the weather data. Depending on the embodiment, the mobile device 112 may similarly transmit the transaction 192 to the parametric engine 180 or to the blockchain 118. As such, the mobile device 112 transmits the transaction 192 to at least one other participant in a network of participants. The transaction 192 may include the weather data or a cryptographic hash value corresponding to the weather data.

In some embodiments, the mobile device 112 or the weather unit 116 may transmit the weather data to a parametric engine 180. The parametric engine 180 may include a processor 182 and a memory that stores various applications for execution by the processor 182. For example, a parametric event module 184 may perform various operations associated with analyzing the parametric event. For example, the parametric event module 184 may look forward and determine a likelihood of damage for the user, determine whether a current coverage for user damage will be exceeded, and/or confirm whether a parametric event has happened.

In particular, the parametric engine 180 may receive weather data from the mobile device 112 and/or the weather unit 116 and use the received weather data in calculating various parameters regarding parametric events. For example, the parametric engine 180 may use the received weather data to calculate a likelihood of a trigger activation for a parametric event. In particular, the parametric engine 180 may receive information regarding a trigger event that is indicative of a parametric event that causes damage to an individual, item, event, etc. Depending on the embodiment, the trigger event may be a particular measurable threshold (e.g., 2 inches of rainfall in an hour), a particular calculated threshold (e.g., a 50% chance of failure for a field), an indicative flag (e.g., detecting that snow has fallen), or any other similar trigger.

Then, the parametric engine 180 may weight and/or utilize the weather data to determine whether the trigger event will happen in a particular time period, is currently happening, or has already happened, depending on the implementation. For example, the parametric engine 180 may receive historical weather data indicative of storms during a given week as well as updated weather data indicative of sunny weather in a particular location. In such an example, the parametric engine 180 may assign greater weight to the updated weather data rather than the historical weather data. In some such embodiments, the parametric event module 184 may use a machine learning algorithm as described herein to detect whether a trigger is met or will be met. For example, the machine learning algorithm may determine that a threshold for precipitation is met, a predetermined amount of damage has occurred, a soil composition has changed, an environment parameter for particular plants has changed, etc.

Similarly, the parametric engine 180 may calculate an estimated loss for a user based upon the likelihood of reaching the trigger threshold. The parametric engine 180 may also determine whether to offer the user updated coverage for the parametric event and/or determine to confirm or authenticate the details of the parametric event. In some embodiments, the parametric engine 180 may perform the calculations and/or the determinations automatically (e.g., making a determination to do so by an artificial intelligence or machine learning program) upon calculating the likelihood of reaching the trigger threshold. In further embodiments, the parametric engine 180 may perform the calculations and/or the determinations responsive to receiving an indication and/or request from a user.

In further embodiments, the parametric event module 184 and/or the training module 183 may execute a smart contract to cause the user(s) to receive a payment from an individual covering the damages, such as an insurance company or underwriter. Although FIG. 1 illustrates both the parametric event module 184 and the training module 183 on the same parametric engine 180, it will be understood that the parametric event module 184 and the training module may operate on different servers.

In some embodiments, a coverage device 114 as described above may transmit parametric event data 194 to the parametric engine 180 for verification of the parametric event. In further embodiments, the parametric event data 194 may include, be, and/or function as a request for verification of the parametric event. In response to the request, the parametric engine 180 may verify the weather data and/or details of the parametric event. In further implementations, the parametric engine 180 and/or the coverage device 114 transmits an indication to the parametric engine 180 to calculate an estimated loss (e.g., a risk) for the user and compare the parametric event details and/or weather data to the estimated loss to confirm the loss. The parametric engine 180 may then transmit the verification to the coverage device 114 for presentation on the display 129. Although the coverage device 114 and the mobile device 112 are depicted separate in FIG. 1, it will be understood that the coverage device 114 and the mobile device 112 may be the same device and/or may be associated with the same user.

In some embodiments, the blockchain 118 may include cryptographic hash values corresponding to the set of weather data used to generate each output. To verify the authenticity of the set of weather data and/or parametric event data used, the parametric engine 180 may compare the set of weather data and/or parametric event data included in the report to the corresponding cryptographic hash values in the blockchain 118. If the set of weather data and/or parametric event data used to generate the respective output does not match with the corresponding cryptographic hash values in the blockchain 118, the parametric engine 180 may determine that an outside party has tampered with the weather data and/or parametric event data. Otherwise, if the set of weather data and/or parametric event data used to generate the report matches with the corresponding cryptographic hash values in the blockchain 118, the parametric engine 180 may determine that the weather data and/or parametric event data is valid and that the quote, calculation, and/or verification is an accurate output.

In some embodiments, the risk calculation (e.g., estimated loss) may include a determination as to the level of coverage required for a user during a given time period. As such, the level of risk in such embodiments may depend on a particular time period and/or updated weather data, as described above. In some embodiments, the estimated loss may refer to a level of risk for a definitive time period (e.g., a day, week, month, year, etc.), or an ongoing level of risk. In further such embodiments, the parametric engine 180 may use the calculated estimated loss to determine an updated level of coverage for a user during the time period in question. For example, the parametric engine 180 may determine that a user may benefit from additional coverage (e.g., an initial coverage plan of $5,000 for 1 inch of rain may be better suited as an updated coverage plan of $10,000 for 2 inches of rain) based upon the estimated loss, the weather data, the likelihood of reaching a trigger threshold, etc. Similarly, the parametric engine 180 may determine that a user may not need the entirety of the coverage, and may offer a discount and/or partial refund to the user upon a determination that such coverage is excessive.

In some embodiments, a mobile device 112 may stream the weather data to a node of the blockchain 118 and/or the network 120 in real or near-real time. For example, the mobile device and/or a reporting application 172 on the mobile device 112 may update the node of the blockchain 118 and/or the network 120 whenever a new event occurs, as described above. In further embodiments, the mobile device 112 may receive confirmations of updated information and may notify the user that the mobile device 112 has updated the blockchain 118 and/or network 120.

As noted above, the system 100 may determine weather data, trigger events, and/or parametric event data at the parametric engine 180 and/or coverage device 114 based upon one or more machine learning models. The training module 183 may train the machine learning model(s) based upon (i) a plurality of sets of weather data having a known rate of reaching a trigger event and/or trigger threshold, (ii) sets of weather data and confirmations from users as to whether the trigger event occurred, and/or (iii) a plurality of sets of weather data and corresponding estimated loss. The machine learning model may use the weather data and/or parametric data to generate the appropriate trigger event detection, estimated loss, etc.

In other embodiments, as an additional or alternative method to the parametric engine 180 detecting the trigger and/or generating the estimated loss, the system 100 may deploy a smart contract to the blockchain 118 and/or network 120 to perform the operations. Any participant in the blockchain network may deploy the smart contract, and the smart contract may expose methods and data to other participants in the blockchain network. The smart contract may obtain weather data for a user and may detect the trigger and/or generate the estimated loss. Some of the data in the smart contract state may be private data that may only be altered by calling a method of the smart contract, or only altered by authorized blockchain participants. In one embodiment, the system 100 may alter the smart contract state by broadcasting a transaction to the distributed ledger network. If the broadcasted transaction satisfies consensus rules, network validators may include the transaction in a block.

Inclusion in the blockchain of a transaction sending data to the smart contract may cause validating nodes to update a state database for the smart contract. Therefore, the validating nodes may allow network participants access to a rich state mechanism to manage the analysis of the weather data and/or the parametric event data, and ultimately to detect the trigger, calculate the estimated loss, determine whether to provide updated coverage, etc. In this embodiment, transmitting a transaction (e.g., transactions 196 or 192) may include transmitting the transaction to an address that stores the smart contract on the blockchain 118.

In response to transmitting a transaction to the blockchain network, a validating node may add the transaction (e.g., transactions 196 or 192) to a block of transactions. Adding the transaction 196 and/or 192 to a block of transactions may include solving a cryptographic puzzle based upon the block of transactions, adding the solution to the cryptographic puzzle to the block of transactions, and transmitting the block of transactions to at least one other participant in the distributed ledger network.

In some embodiments, to cryptographically link blocks and transactions together, each block in the blockchain 118 may organize transactions into a Merkle Tree. In a Merkle Tree, the respective block hashes each transaction according to a cryptographic hashing algorithm (e.g., SHA-256) and then combines the resulting output hash with the hash of another transaction. Then the respective block hashes the combined result according to the cryptographic hashing algorithm. The block then combines the output with the hash of two other transactions and this process is repeated until all of the transactions in the block are combined and hashed to generate a Merkle root that is used in the header for a block. If any single transaction in the block is tampered with, a different Merkle root would be generated since the Merkle root is a combination of the hashes of all of the transactions in the block.

In other words, the system 100 may hash the transactions using a cryptographic hash algorithm, such as the algorithms discussed above, and the system 100 may store the hash of each transaction in the tree. As the system 100 constructs the tree, the block may hash together the hash of each adjacent node at the same level to create a new node that exists at a higher level in the tree. Therefore, the node at the top of the tree or Merkle root, may be dependent upon the hash of each transaction stored below in the tree. Each transaction may include a set of data. The set of data may include identifying data for the transaction, and transaction data identifying the nature of the transaction and what the transaction entails (e.g., input and output addresses, a transaction value, a document hash value, a timestamp, a transaction fee value, etc.).

To verify that a block is valid, a node may compare the Merkle root of the block to the Merkle root for the same block included in other nodes' copies of the blockchain. Thus, the Merkle root may be proof of the transactions included in the block and proof that the contents of the block have not been tampered with if the Merkle root is the same in each node's copy of the block.

In one embodiment, documents stored "on" a blockchain are documents that have been hashed according to a cryptographic hashing algorithm (e.g., SHA-256) and the resulting output hash has been included in a transaction in a block that has been accepted by the network nodes as satisfying the consensus rules of the blockchain. As such, the documents may be later verified or validated by comparing the hash of the documents to the hash stored on the blockchain. For example, if a set of documents results in a SHA-256 hash recorded on a blockchain on a certain date, then the blockchain may provide cryptographic proof that the documents existed as of that date.

In some embodiments, the system 100 may store a document on a blockchain by broadcasting a transaction including a hash of the document to the network, which a component of the system 100 may include in a block if the transaction satisfies all of the consensus rules of the network. In some embodiments, the blockchain may be a permissioned ledger, meaning only authorized network participants may broadcast transactions. In other embodiments, only some authorized network participants may make certain transactions. For example, the weather unit 116 and/or the mobile device 112 may upload the weather data to the blockchain 118. Only a cryptographic hash of the data may be included in the blockchain 118 such that the blockchain may verify the data even if a party off-chain obtains the data.

Validating network nodes may verify that the signed transaction or signed message was signed by the private cryptographic key corresponding to the published public cryptographic key. In at least one embodiment, the blockchain network may apply a valid proof-of-identity as a consensus rule. As such, the network may reject any transaction attempting to add new weather data and/or parametric event data to the blockchain without a cryptographic proof-of-identity matching an identity authorized to add new weather data and/or parametric event data as non-compliant with the consensus rule. Each weather unit 116 and/or mobile device 112 may be assigned a public key/private key pair which is identified in the blockchain network as corresponding to the weather unit 116 and/or mobile device 112. If the validating network nodes receive a transaction regarding weather data and/or parametric event data that is not from an authorized weather unit 116 and/or mobile device 112, the validating network nodes may reject the transaction.

The mobile device 112 and the weather unit 116 may be associated with the same user. Weather unit 116 may be communicatively coupled to coverage device 114 via a network 120. Network 120 may be a single communication network, or may include multiple communication networks of one or more types (e.g., one or more wired and/or wireless local area networks (LANs), and/or one or more wired and/or wireless wide area networks (WANs) such as the Internet). In some implementations, the coverage device 114 may connect to the network 120 via a communications interface 124 much like mobile device 112. Similarly to mobile device 112, the coverage device 114 may include processors 122 by which the coverage device 114 may receive requests and transmit notifications 128, as well as a display 129.

While FIG. 1 shows only one mobile device 112, it is understood that many different mobile devices (of different users), each similar to mobile device 112, may be in remote communication with network 120. Additionally, while FIG. 1 shows only one weather unit 116, it is understood that many different entity locations, each similar to weather unit 116, may be in remote communication with network 120. Further, while FIG. 1 shows only one coverage device 114, it is understood that many different devices, each similar to coverage device 114, may be in remote communication with network 120.

It will be understood that the above disclosure is one example and does not necessarily describe every possible implementation. As such, it will be further understood that alternate embodiments may include fewer, alternate, and/or additional steps or elements.

Exemplary Machine Learning

As described herein, the system 100 may analyze unstructured weather data, calculate a likelihood of a trigger activation for a parametric event, calculate an estimated loss, determine whether to offer updated coverage, and/or authenticate a parametric event from the weather data and/or parametric event data using a machine learning model for data evaluation. The machine learning model may be trained based upon a plurality of sets of weather data and/or parametric event data, and corresponding output data and/or determinations. In some embodiments, the machine learning model may use some of the output data to generate additional output data and/or determinations.

Machine learning techniques have been developed that allow statistical analysis of large quantities of data. Such machine learning techniques may be used to automatically identify relevant variables (i.e., variables having statistical significance or a sufficient degree of explanatory power) from data sets. This may include identifying relevant variables or estimating the effect of such variables that indicate actual observations in the data set. This may also include identifying latent variables not directly observed in the data, viz. variables inferred from the observed data points.

In some embodiments, the methods and systems described herein may use machine learning techniques to identify and estimate the effects of observed or latent variables such as weather, temperature, seasonal hazards and/or changes, local fauna, local flora, air quality, pollen, landscape, bodies of water, local population density, local classification (e.g., urban, rural, suburban, city, town, village, etc.), proximity to a fire station, presence of nearby fire hydrants, adherence to respective best practices, history of parametric events, historical weather data, appliances, smart devices, water consumption, power consumption, security, type of claim, cost of claim, cause of the claim, confirmation of fault, liability amount paid out, property damage paid out, freeform data (need to understand that from a data perspective, so needs other processing), coverage is paid, catastrophe, bodily injury, repair costs, estimated values for items damaged, prior damage, claim subrogation status, location of loss, date of loss, time of loss, date the claim was reported, etc.

Some embodiments described herein may include automated machine learning to determine estimated loss (e.g., risk), identify relevant risk factors, evaluate weather data and/or parametric event data, identify environmental risk factors, identify locale-based risk factors, identify property risk factors, analyze unstructured weather data, calculate a likelihood of a trigger activation for a parametric event, determine whether to offer updated coverage, authenticate a parametric event from the weather data and/or parametric event data, and/or perform other functionality as described elsewhere herein.

Although the methods described elsewhere herein may not directly mention machine learning techniques, such methods may be read to include such machine learning for any determination or processing of data that may be accomplished using such techniques. In some embodiments, such machine-learning techniques may be implemented automatically upon occurrence of certain events or upon certain conditions being met. Use of machine learning techniques, as described herein, may begin with training a machine learning program, or such techniques may begin with a previously trained machine learning program.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data (such as location, online activity, mobile device data, weather unit data, and/or updated sensor data) in order to facilitate making predictions for subsequent user data. Models may be created based upon example inputs of data in order to make valid and reliable predictions for novel inputs.

Additionally or alternatively, the machine learning programs may be trained by inputting sample data sets or certain data into the programs, such as mobile device, server, or weather unit sensor and/or control signal data, and other data discussed herein. The machine learning programs may utilize deep learning algorithms that are primarily focused on pattern recognition, and may be trained after processing multiple examples. The machine learning programs may include Bayesian program learning (BPL), voice recognition and synthesis, image or object recognition, optical character recognition, and/or natural language processing, either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct or a preferred output. In unsupervised machine learning, the processing element may be required to find its own structure in unlabeled example inputs. In one embodiment, machine learning techniques may be used to extract the control signals generated by computer systems or sensors, and under what conditions those control signals were generated.

The machine learning programs may be trained with smart device-mounted, home-mounted, and/or mobile device-mounted sensor data to identify certain weather data, such as analyzing unstructured weather data to identify and/or determine environmental data, location data, parametric event data, historical data, structured weather data, and/or other such potentially relevant data.

After training, machine learning programs (or information generated by such machine learning programs) may be used to evaluate additional data. Such data may be related to publically accessible data. Other data may be related to privately-held data, such as insurance and/or claims information related to the property and/or items associated with the property. The trained machine learning programs (or programs utilizing models, parameters, or other data produced through the training process) may then be used for determining, assessing, analyzing, predicting, estimating, evaluating, or otherwise processing new data not included in the training data. Such trained machine learning programs may, therefore, be used to perform part or all of the analytical functions of the methods described elsewhere herein.

Figure 2:
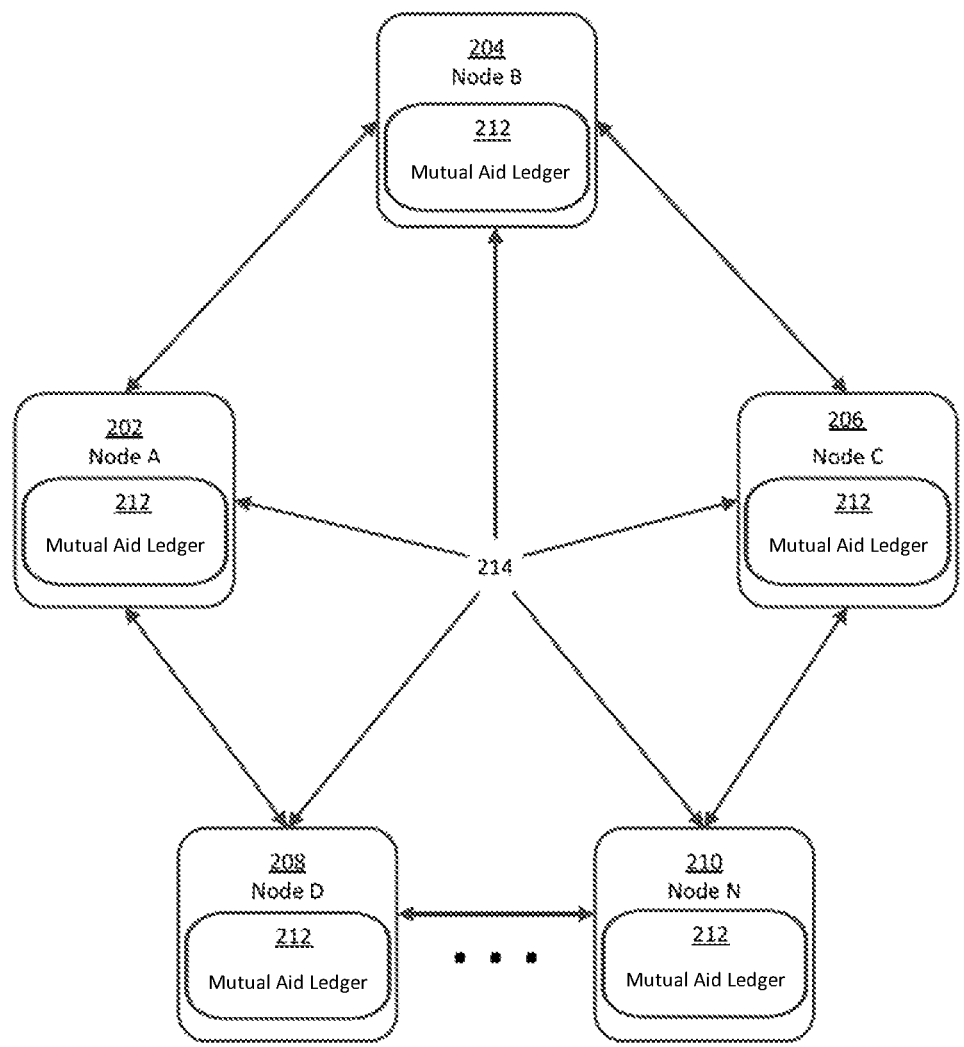
FIG. 2 depicts an exemplary distributed ledger system for recording transactions and executing smart contracts related to parametric event(s), in accordance with one aspect of the present disclosure.

Exemplary Validating Nodes in a Distributed Ledger System Including a Parametric Engine FIG. 2 depicts an exemplary distributed ledger system 200 for generating transactions based upon weather data for a parametric event, updating a distributed ledger, detecting a parametric event trigger, authenticating a parametric event, and/or calculating an estimated loss using aggregated weather data from the distributed ledger in accordance with various aspects of the present disclosure. The system 200 may include a distributed mutual aid ledger 212 and a plurality of nodes 202, 204, 206, 208, and 210. Each node maintains a copy of the mutual aid ledger 212. As changes are made to the mutual aid ledger 212, each node receiving the change via network 214 may update the respective copy of the distributed mutual aid ledger 212 stored on the node. In some embodiments, the network 214 may be or may include the blockchain 118 of FIG. 1. A consensus mechanism may be used by the nodes 202-210 in the distributed ledger system 200 to decide whether to the nodes 202-210 may make received changes to the mutual aid ledger 212.

Each node in the system therefore may have a copy of the mutual aid ledger 212, which is identical to every other copy of the mutual aid ledger 212 stored by the other nodes. The distributed ledger system 200 is more robust than a central authority database system because of the distributed ledger's decentralized nature. As such, there is no single point of failure on the distributed ledger system 200 as there would be in a centralized system.

It will be understood that the above disclosure is one example and does not necessarily describe every possible implementation. As such, it will be further understood that alternate embodiments may include fewer, alternate, and/or additional steps or elements.

Exemplary Transaction Flow & Block Propagation Flow

Figure 3:
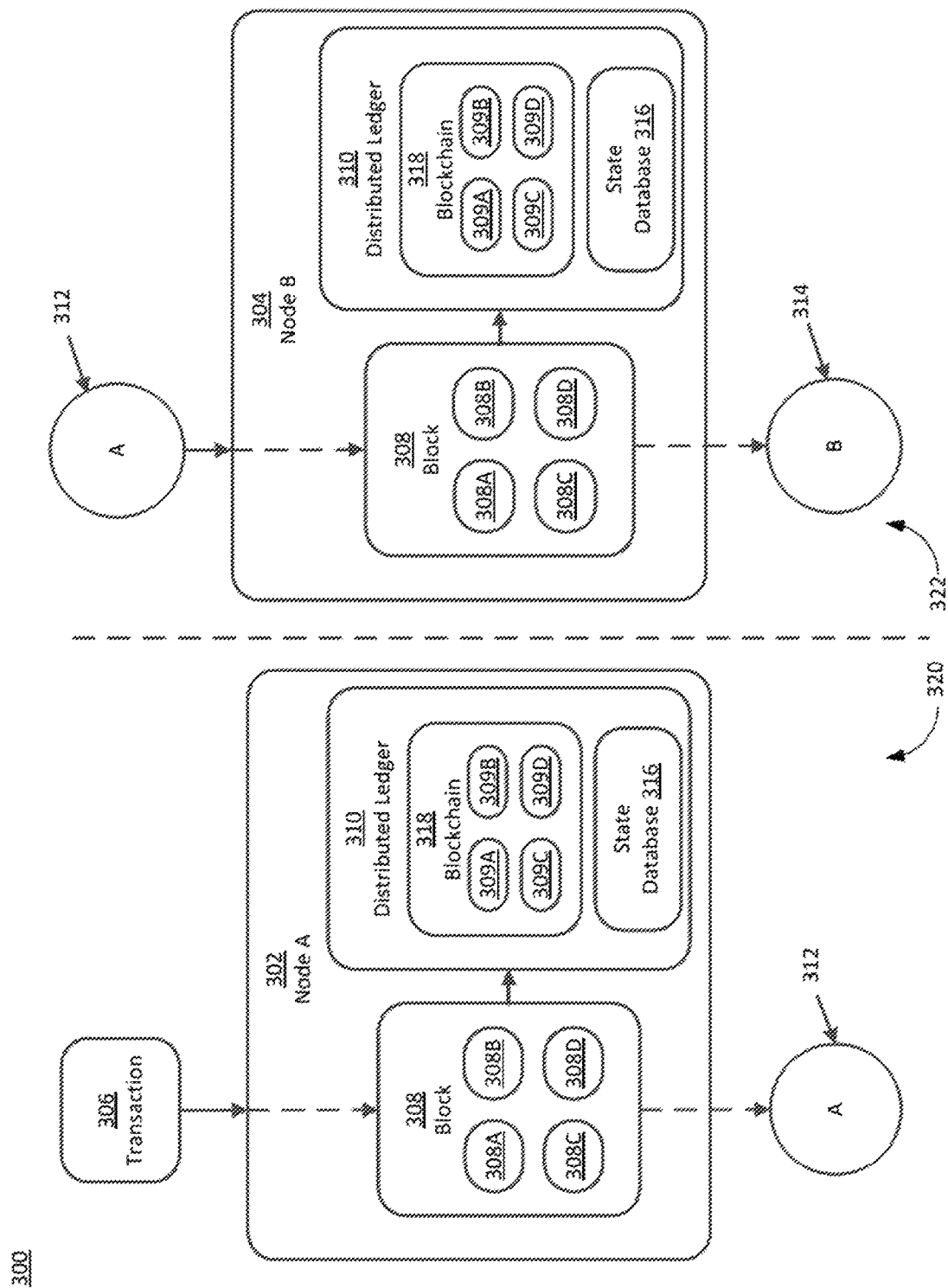
FIG. 3 depicts exemplary validating network nodes and an exemplary transaction flow on a distributed ledger network related to parametric event(s), in accordance with one aspect of the present disclosure.

FIG. 3 depicts exemplary validating network nodes and an exemplary transaction flow 300 on a distributed ledger network for generating transactions based upon weather data for a parametric event, updating a distributed ledger, detecting a parametric event trigger (or a trigger event), authenticating a parametric event (or trigger event), and/or calculating an estimated loss using aggregated weather data from the distributed ledger in accordance with various aspects of the present disclosure. FIG. 3 may include two time frames 320 and 322 represented by the left and right sides of the dotted line, respectively, Node A 302 and Node B 304, a set of transactions 308A-308D, a set of blocks of transactions 309A-309D, a distributed ledger 310, a state database 316, and a blockchain 318.

The block propagation flow 300 may begin with Node A 302 receiving transaction 306 at time 320. When Node A 302 confirms that transaction 306 is valid, the Node A 302 may add the transaction 306 to a newly generated block 308. As part of adding the transaction 306 to block 308, Node A 302 may solve a cryptographic puzzle and may include the solution in the newly generated block 308 as proof of the work done to generate the block 308. In other embodiments, Node A 302 may add the transaction 306 to a pool of transactions until a sufficient number of transactions in the pool exist to form a block 308. Node A 302 may then transmit the newly created block 308 to the network at 312. Before or after propagating the block 308, Node A 302 may add the block 308 to its copy of the blockchain 318.

The transactions 309A-309D may include updates to a state database 316. The state database 316 may contain current values of variables created by smart contracts deployed on the blockchain 318. Validated blocks such as block 308 may include transactions affecting state variables in state database 316. At time 322 Node B 304 may receive the newly created block 308 via the network at 312. Node B 304 may verify that the block of transactions 308 is valid by checking the solution to the cryptographic puzzle provided in the block 308. If the solution is accurate then Node B 304 may add the block 308 to its blockchain 318 and make any updates to the state database 316 as required by the transactions in block 308. Node B 304 may then transmit the block 308 to the rest of the network at 314.

It will be understood that the above disclosure is one example and does not necessarily describe every possible implementation. As such, it will be further understood that alternate embodiments may include fewer, alternate, and/or additional steps or elements.

Exemplary Applications for Communicating with the Parametric Engine

Figure 4:
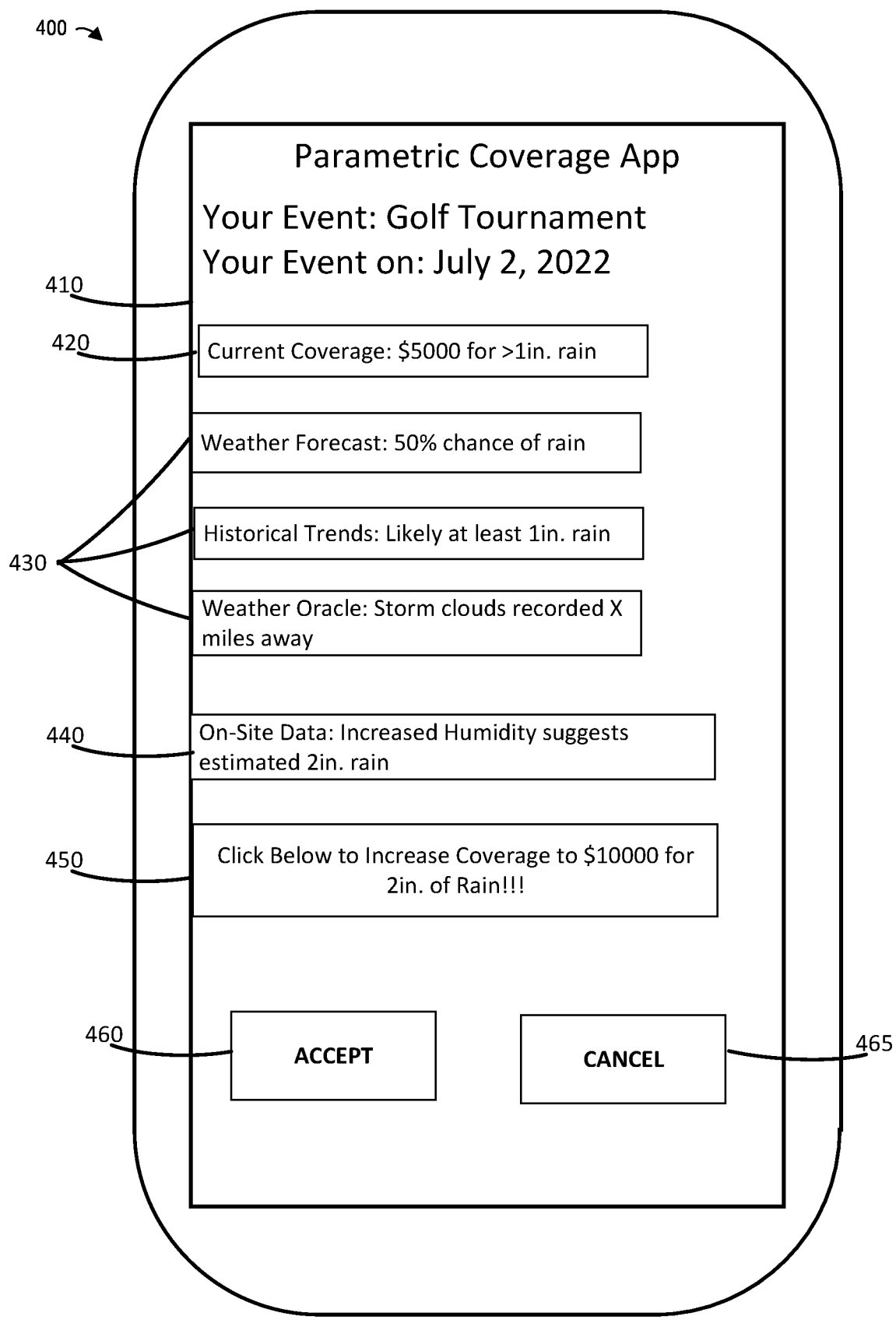
FIG. 4 depicts an exemplary user interface for an application through which a user receives an offer for increased coverage after a determination of such by an exemplary parametric engine, in accordance with one aspect of the present disclosure.

FIG. 4 illustrates an exemplary interface 400 that displays a page 410 of an application or a website providing information regarding coverage for an event that may be affected by a parametric event to a user. In particular, the page 410 provides a current coverage 420 covering the event (in this case, $5,000 for more than 1 inch of rain), weather data 430 that a parametric engine (e.g., parametric engine 180 of FIG. 1) determines is relevant for the user, updated weather data 440, an offer 450 for updated coverage, and buttons 460/465 to accept or cancel the offer. Although FIG. 4 illustrates three instances of weather data 430 and one instance of updated weather data 440, it will be understood that a page 410 may provide any suitable number of weather data points 430 and/or updated weather data points 440, including none or all applicable weather data 430 and/or updated weather data 440.

In some embodiments, the current coverage 420 may be a total amount of coverage available for a particular event, property, or individual according to a user insurance policy. Depending on the embodiment, the current coverage 420 may be part of a larger insurance policy (e.g., an overall policy for a property with maximum coverage for any individual event), an individual insurance policy (e.g., a temporary insurance policy taken out for a particular event), a recurring insurance policy (e.g., an insurance policy taken out for a particular event every year), etc. In some embodiments, the current coverage 420 may be stored on a server in or communicatively coupled with the parametric engine 180, as part of a blockchain network, as part of a smart contract, etc. In some such embodiments, the parametric engine 180 may determine the current coverage 420 for the user by retrieving and/or receiving data regarding the current coverage 420. In further embodiments, the parametric engine 180 may analyze and/or extract the current coverage from other data the parametric engine 180 collects and/or stores. For example, the parametric engine 180 may receive and/or store an image of a document detailing the current coverage 420. The parametric engine 180 may then extract the current coverage 420 from the image using techniques such as optical character recognition (OCR) and/or natural language processing (NLP).

Depending on the embodiment, the interface 410 may additionally or alternatively display weather data 430. In some embodiments, the parametric engine 180 may determine what weather data 430 the interface 410 based upon which gathered weather data is most relevant to the event being monitored and covered. The parametric engine 180 may make such a determination based upon the gathered weather data, parametric event data, data related to the event being covered, etc. In some embodiments, the parametric engine 180 may make the determination using a machine learning algorithm as described herein. In further embodiments, the interface 410 displays the weather data 430 corresponding to any collected weather data. Depending on the embodiment, the interface 410 may display one or more instances of weather data 430 that scroll or otherwise change. In some such embodiments, the user interacts with the weather data 430 (e.g., via a tap, touch, swipe, etc.) to change the currently displayed data. In further embodiments, weather data 430 automatically changes. In still further embodiments, the interface automatically changes the weather data 430, but accepts inputs from a user to change the currently displayed data as well. In some embodiments, the parametric engine 180 may analyze gathered weather data and cause the interface 410 to display a summarized version of the data as the weather data 430.

In some embodiments, the interface 410 may additionally or alternatively display updated weather data 440. Depending on the embodiment, the updated weather data 440 may be data received from one or more smart devices located near or at the covered location. The updated weather data 440 may further include data gathered within a predetermined time period from a user access time (e.g., real-time, last hour, last day, etc.). In some embodiments, the parametric engine 180 may analyze gathered updated weather data and cause the interface 410 to display a summarized version of the data as the updated weather data 440. In further embodiments, the interface 410 may display one or more instances of updated weather data 440 as outlined above with regard to the weather data 430.

The interface 410 may additionally display an offer 450 for increased coverage. In some embodiments, the interface 410 may display buttons 460/465 to accept or decline the offer. Depending on the embodiment, the offer 450 or the buttons 460/465 may be or include a link to a webpage, application page, separate application, etc. with further details about the offer.

It will be understood that the above disclosure is one example and does not necessarily describe every possible embodiment. As such, it will be further understood that alternate embodiments may include fewer, alternate, and/or additional steps or elements.

Figure 5:
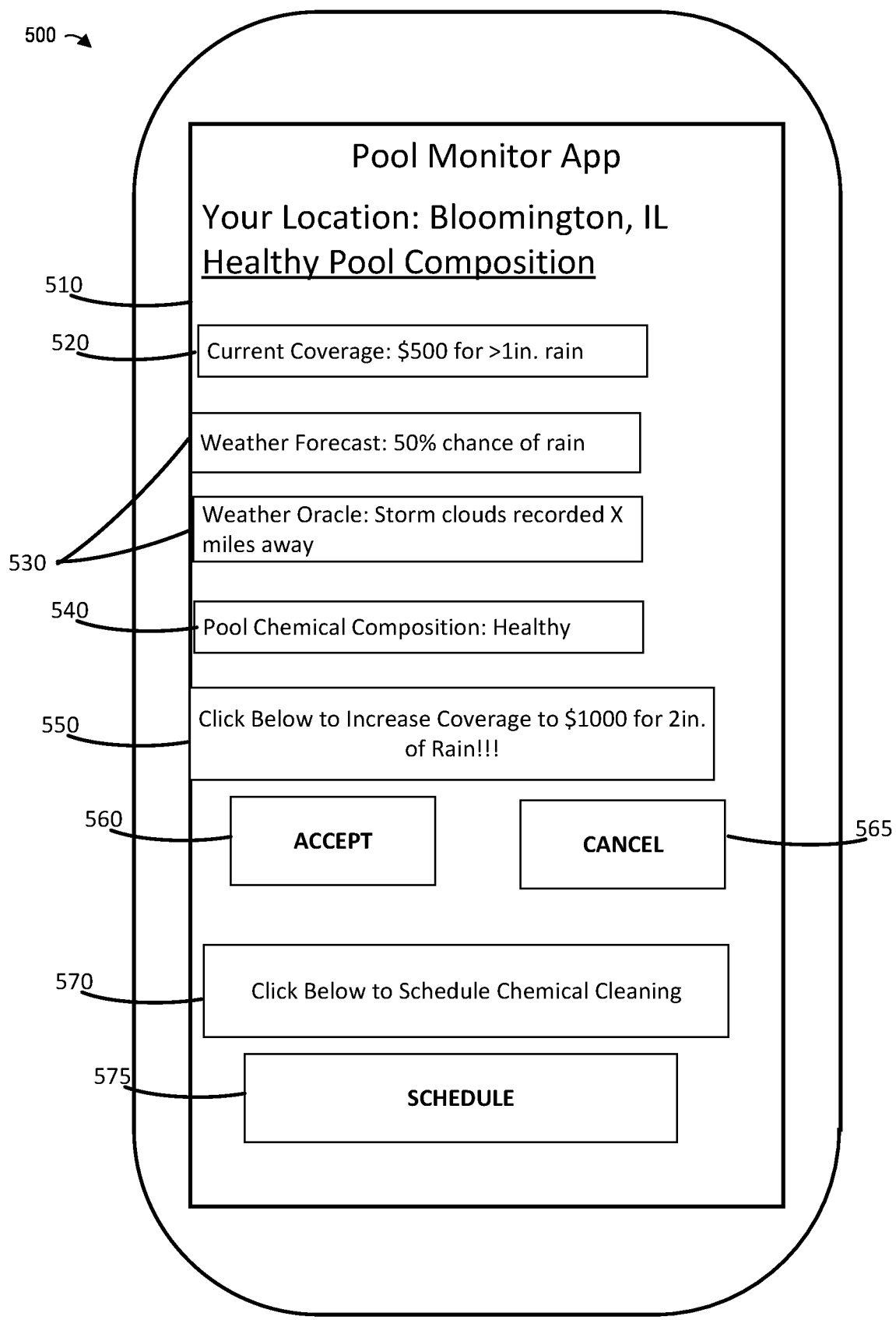
FIG. 5 depicts an exemplary user interface for an application through which a user receives an offer for increased coverage and/or a notification to repair damage, in accordance with one aspect of the present disclosure.

FIG. 5 illustrates an exemplary interface 500 that displays a page 510 of an application or a website providing information for a property, such as a pool, to a user. In particular, the page 510 provides a current coverage 520 covering the event (in this case, $500 for more than 1 inch of rain), weather data 530 that a parametric engine (e.g., parametric engine 180 of FIG. 1) determines is relevant for the user, pool sensor data 540, an offer 550 for updated coverage, buttons 560/565 to accept or cancel the offer, and an offer 570 and button 575 to schedule maintenance for the property. Although FIG. 5 illustrates two instances of weather data 530 and one instance of pool sensor data 540, it will be understood that a page 510 may provide any suitable number of such as described in more detail with regard to FIG. 4 above.

In some embodiments, each of the numbered elements of FIG. 5 may share at least some functionality with the correspondingly numbered elements of FIG. 4. As such, embodiments and techniques described with regard to elements of FIG. 4 may apply to the corresponding elements of FIG. 5. Similarly, in some embodiments, the offer 570 and button 575 may function similarly to offer 550 and buttons 560/565, respectively.

Further, it will be understood that, although FIGS. 4 and 5 depict mobile devices and interfaces, depending on the embodiment, the system 100 may notify a user through email, text, an application, a webpage, a brochure/newsletter, a phone call, or any other similar technique.

It will be understood that the above disclosure is one example and does not necessarily describe every possible embodiment. As such, it will be further understood that alternate embodiments may include fewer, alternate, and/or additional steps or elements.

Exemplary Distributed Ledger Operations

Figure 6:
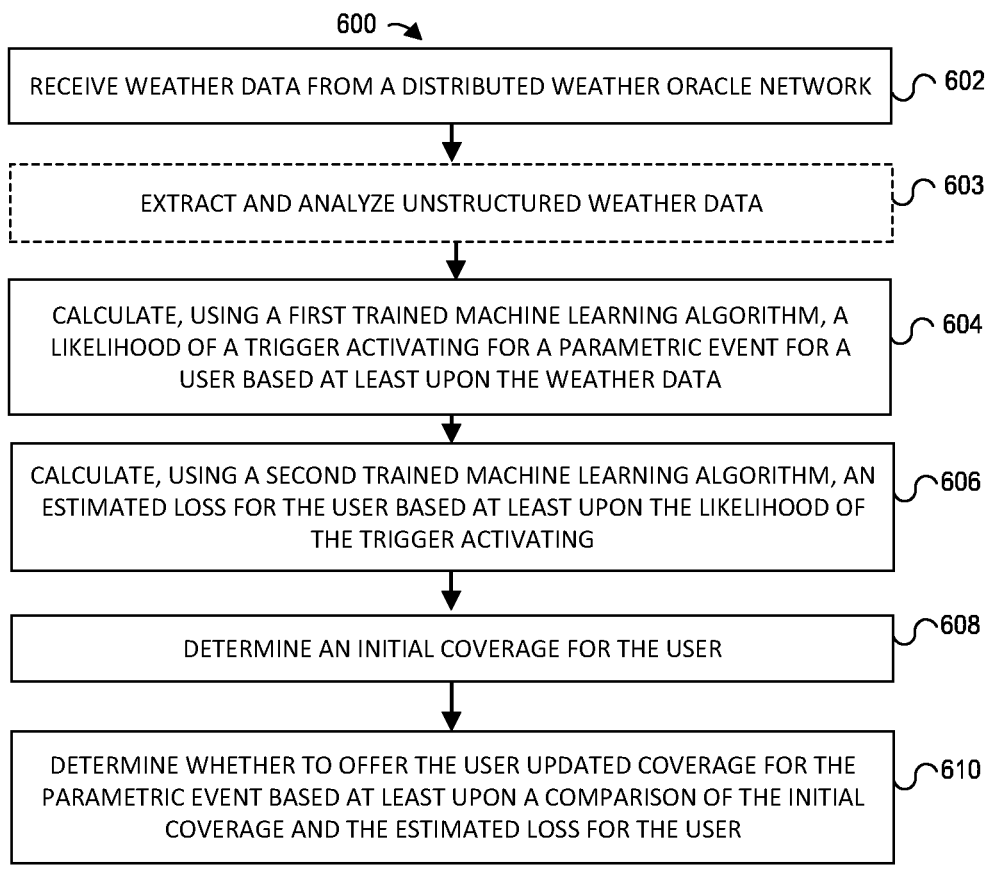
FIG. 6 depicts a flow diagram representing an exemplary computer-implemented method for determining a likelihood of a trigger activation for a parametric event, an estimated loss, and whether to offer updated coverage, in accordance with one aspect of the present disclosure.

FIG. 6 is a flow diagram of an exemplary computer-implemented method 600 for determining a likelihood of a trigger activation for a parametric event, an estimated loss, and whether to offer updated coverage. The method 600 may be implemented by one or more processors of a computing device such as parametric engine 180. Alternatively or additionally, the method 600 may be implemented by one or more processors of a distributed system such as system 100 and/or various components of system 100 as described with regard to FIG. 1 above.

At block 602, the parametric engine 180 may receive weather data at the distributed ledger. In some embodiments, the parametric engine 180 may receive the weather data from a weather oracle, such as a distributed weather oracle network, as described in more detail above with regard to FIG. 1. In further embodiments, the parametric engine 180 may additionally or alternatively receive the weather data from an Application Programming Interface (API) of a synthetic aperture radar (SAR), a smart device, a weather database, a weather application, a website, a chatroom, a blog, storm chaser comments, a video/audio sharing platform, a sensor as described herein, and/or any other source as described herein.

In further embodiments, the parametric engine 180 may further receive other data related to a parametric event in question. For example, the parametric engine 180 may receive soil data, chemical data, broader environmental data, etc. As such, in some embodiments, the parametric engine 180 may further perform the steps as described herein using additional or alternative data from the weather data.

In some embodiments, the weather data may be unstructured weather data. As such, at block 603, the parametric engine 180 may extract and/or analyze the unstructured weather data. For example, in some such embodiments, the parametric engine 180 analyzes the unstructured weather data using natural language processing (NLP) and/or otherwise normalizes the unstructured weather data before using the weather data for detecting a parametric event trigger, authenticating a parametric event, and/or calculating an estimated loss.

At block 604, the computing system 100 may calculate, based at least upon the weather data, a likelihood of a trigger for a parametric event activating for a user (e.g., a trigger activation). Depending on the embodiment, the parametric event may be a particular weather event (e.g., a rainfall of greater than 2 inches in an hour, a hail storm, a tornado, high winds, heavy down pour, etc.), a general weather event (e.g., a spate of unseasonably cold weather for a week; prolonged drought, lack of rain during a certain time period (such as during July or August, or during pollination), etc.), a general status event (e.g., a failure of a field of crops, or below average yields for one or more fields), another type of parametric event (e.g., a chemical composition change in soil contents), etc. Similarly, depending on the embodiment, the trigger event may be a particular measurable threshold (e.g., 2 inches of rainfall in an hour or less, hail for 15 minutes, high winds for 20 minutes, etc.), a particular calculated threshold (e.g., a 50% chance of failure for a field, 20% estimated crop yield loss (such as due to lack of rain during and after pollination), an indicative flag (e.g., detecting that snow has fallen or a frost has occurred during the early or late growing season—damaging the crop, leading to crop loss, or ending the growing season prematurely), or any other similar trigger.

In some embodiments, the user or an entity maintaining the parametric engine 180 may set the trigger event when the user purchases initial coverage (such as insurance coverage or crop insurance coverage); register the item, event, individual, etc. using a website or application; execute a smart contract; etc. The particular details of the trigger event may be stored on the distributed ledger, may be included in any transactions related to the user and/or the parametric event, and/or may be stored in a smart contract detailing the user relation with the zero-trust index mutual aid.

In some embodiments, the parametric engine 180 may calculate the likelihood of the trigger for the parametric event activating for the user responsive to receiving weather data related to the trigger and/or a threshold of the trigger. For example, the parametric engine 180 may receive an indication from a weather oracle that 2 inches of rainfall are predicted by a weather monitoring agency for an area for a user. In further embodiments, the parametric engine 180 may analyze the received weather data to determine that a trigger will be met for a parametric event. For example, the parametric engine 180 may receive data from a weather oracle suggesting a decline in temperature and data from a soil sensor suggesting that the soil will soon start drying out. From the received data, the parametric engine 180 may determine that a trigger of a 50% chance of failure for a field will be met, and may subsequently proceed to block 606.

Depending on the embodiment, the parametric engine 180 may calculate the likelihood of the trigger using a trained machine learning algorithm, as described in more detail above with regard to FIG. 1. Further, the parametric engine 180 may train the machine learning algorithm using training data and/or real world data. In some such embodiments, the parametric engine 180 may receive an indication from a user or from an entity maintaining the parametric engine 180 whether the machine learning algorithm accurately calculated whether the trigger for the parametric event would activate. Then, based upon the indication and the weather data used to make the determination, the parametric engine 180 may update (e.g., train) the machine learning algorithm. In some embodiments, the parametric engine 180 may train the machine learning algorithm by updating weight values assigned to types of data, modifying the techniques for analyzing unstructured data, changing the sources of data used, changing the weights of sources of data used, etc.

At block 606, the parametric engine 180 may calculate an estimated loss for the user based at least upon the likelihood of the trigger activating. In some embodiments, the parametric engine 180 may calculate the estimated loss by analyzing gathered weather data, the likelihood of the trigger activating, data on the event, data on an individual, data on property, etc. Depending on the embodiment, the parametric engine 180 may calculate an estimated loss based upon data such as the weather data and subsequently modify the estimated loss based upon the likelihood of the trigger activating. For example, if the parametric engine 180 calculates the likelihood of the trigger activating to be 90% and the estimated loss to be $10,000, the parametric engine 180 may then calculate the estimated loss to be $9,000. In further embodiments, the parametric engine 180 may calculate estimated loss based upon the likelihood of the trigger activating by only calculating the estimated loss responsive to determining that the likelihood of the trigger activating satisfies a predetermined threshold value.

Depending on the embodiment, the parametric engine 180 may calculate the estimated loss for the user using a second machine learning algorithm. Similarly, the parametric engine 180 may train the second machine learning algorithm as described above with regard to at least block 606 and FIG. 1. Depending on the embodiment, the parametric engine 180 may use an output of the first machine learning algorithm as an input, thereby further improving the functionality of the system by normalizing an input so that the parametric engine 180 may analyze the inputs collectively (e.g., in the case of unstructured weather data) and/or by improving the accuracy of a predicted event used in performing the calculation for the estimated loss.

At block 608, the parametric engine 180 may determine an initial coverage (such as insurance coverage or crop insurance coverage) for the user. Depending on the embodiment, the initial coverage may be part of a larger insurance policy (e.g., an overall policy for a property with maximum coverage for any individual event), an individual insurance policy (e.g., a temporary insurance policy taken out for a particular event), a recurring insurance policy (e.g., an insurance policy taken out for a particular event every year), etc. In some embodiments, the initial coverage may be stored on a server in or communicatively coupled with the parametric engine 180, as part of a blockchain network, as part of a smart contract, etc. In some such embodiments, the parametric engine 180 may determine the initial coverage for the user by retrieving and/or receiving data regarding the initial coverage. In further embodiments, the parametric engine 180 may analyze and/or extract the initial coverage from other data the parametric engine 180 collects and/or stores. For example, the parametric engine 180 may receive and/or store an image of a document detailing the initial coverage. The parametric engine 180 may then extract the initial coverage from the image using techniques such as OCR and/or NLP.

At block 610, the parametric engine 180 determines whether to offer the user updated coverage for the parametric event based at least upon a comparison of the initial coverage and the estimated loss for the user. In some embodiments, should the parametric engine 180 determine that an estimated loss is likely to exceed the bounds of a user policy, the parametric engine 180 may cause the user to receive an offer for an increased coverage range on the policy. Similarly, should the parametric engine 180 determine that an estimated loss is unlikely to be covered by a user policy, the parametric engine 180 may cause the user to receive an offer for additional coverage types. Should the parametric engine 180 determine that the user is unlikely to use the entirety of the user policy, the parametric engine 180 may similarly cause the user to receive an offer for a discount, refund, credit, etc. to reimburse at least some of the unused portion of the policy.

It will be understood that the above disclosure is one example and does not necessarily describe every possible implementation. As such, it will be further understood that alternate embodiments may include fewer, alternate, and/or additional steps or elements.

Figure 7:
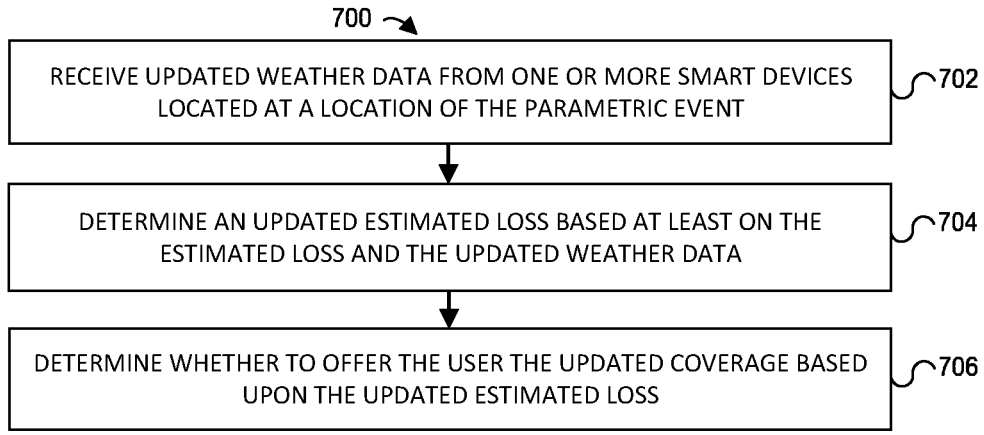
FIG. 7 depicts a flow diagram representing an exemplary computer-implemented method for receiving updated weather data, determining an updated estimated loss, and determining whether to offer updated coverage, in accordance with one aspect of the present disclosure.

FIG. 7 is a flow diagram of an exemplary computer-implemented method 700 for receiving updated weather data, determining an updated estimated loss, and determining whether to offer updated coverage. The method 700 may be implemented by one or more processors of a computing device such as parametric engine 180. Alternatively or additionally, the method 700 may be implemented by one or more processors of a distributed system such as system 100 and/or various components of system 100 as described with regard to FIG. 1 above.

At block 702, the parametric engine 180 may receive updated weather data from one or more smart devices located at a location of the parametric event. For example, the user, a third-party, an entity responsible for maintaining the parametric engine 180, etc. may place one or more sensors and/or devices with sensors, such as smart devices, at a location for a potential parametric event (e.g., at an event location, a location where an individual works or sleeps, a location where property is, etc.). In some such embodiments, the smart devices may measure the location for updated weather data and transmit the updated weather data to the parametric engine 180. As such, the parametric engine 180 may receive temporally and geographically specific data regarding a potential parametric event in addition to more general and/or broader data from a weather unit (e.g., weather unit 116 of FIG. 1).

At block 704, the parametric engine 180 may calculate an updated estimated loss using the updated weather data. In some embodiments, the parametric engine 180 may use an estimated loss as described with regard to FIG. 6 above as an input and may update the previously calculated estimated loss using the updated weather data. Depending on the embodiment, the parametric engine 180 may calculate the updated estimated loss based upon the estimated loss and the updated weather data by using the estimated loss and updating the input values according to the updated weather data (e.g., using the same algorithm as described with regard to block 606). In further embodiments, the parametric engine 180 may use the estimated loss and the updated weather data as inputs to a separate algorithm to generate the updated estimated loss. In some embodiments, the parametric engine 180 may calculate the updated estimated loss using a machine learning algorithm. Depending on the embodiment, the parametric engine 180 may train the machine learning algorithm. The parametric engine 180 may use and/or train the machine learning algorithm as described in more detail above with regard to FIGS. 1 and 6.

At block 706, the parametric engine 180 may determine whether to offer the user updated coverage based upon the updated estimated loss. In some embodiments, the parametric engine 180 may make the determination similarly to the determination in block 610, described with regard to FIG. 6 above. Similarly to block 704, the parametric engine 180 may determine whether to offer the updated coverage by updating the values and/or an algorithm used to make the determination.

In some embodiments, at least part of the method 700 may occur substantially simultaneously with at least part of the method 600 as described above. For example, the parametric engine 180 may implement blocks 704 and 706 subsequent to performing block 606 (i.e., calculating the estimated loss), but before and/or in conjunction with block 608 and/or block 610.

As an example of method 700, a user may purchase temporary insurance on a golf tournament in case of poor weather. General weather data may indicate to the parametric engine 180 that the tournament will have sunny weather. However, one week prior to the tournament, smart devices may be placed around the golf course, which may indicate that 2 inches of rain will fall on the day of the tournament. The parametric engine 180 may receive the updated data, calculate an updated estimated loss based upon the updated weather data, and ultimately determine to offer the user increased coverage for 2 inches of rain.

Figure 8:
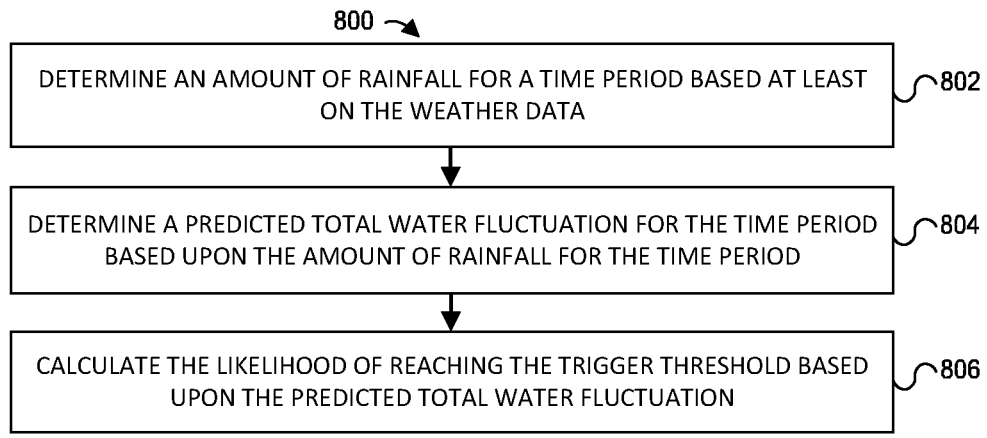
FIG. 8 depicts a flow diagram representing an exemplary computer-implemented method for calculating a likelihood of a trigger activation based upon a predicted total water fluctuation, in accordance with one aspect of the present disclosure.

FIG. 8 is a flow diagram of an exemplary computer-implemented method 800 for calculating a likelihood of a trigger activation for a parametric event based upon a predicted total water fluctuation. The method 800 may be implemented by one or more processors of a computing device such as parametric engine 180. Alternatively or additionally, the method 800 may be implemented by one or more processors of a distributed system such as system 100 and/or various components of system 100 as described with regard to FIG. 1 above.

At block 802, the parametric engine 180 may determine an amount of precipitation (e.g., rainfall) for a time period based at least on received weather data, such as the weather data received at block 602 in FIG. 6. In some embodiments, the parametric engine 180 may determine the amount of precipitation directly from the weather data (e.g., the weather data includes a measure of the amount of rainfall). In further embodiments, the parametric engine 180 may analyze the weather data to determine the precipitation. In still further embodiments, the parametric engine 180 may determine the amount of precipitation for a particular location or piece of property, such as on a pool. As such, the parametric engine 180 may use the received weather data to determine the localized precipitation.

At block 804, the parametric engine 180 may determine a predicted total water fluctuation for the time period based upon the amount of precipitation for the time period. Depending on the embodiment, the predicted total water fluctuation may be a fluctuation in water volume (e.g., the total volume of water in an outside pool), a chemical composition of the water (e.g., a change in pH, alkalinity, hardness, stabilizer, chlorine, etc.), water composition (e.g., additional non-water items displaced into a body of water), etc. In some embodiments, the total water fluctuation may be for property that initially holds water (e.g., a pool, pond, etc.), property that may hold water by dint of the design (e.g., a depressed patio, a valley, etc.), property that may absorb water (e.g., a lawn, a flowerbed, etc.), or any other property that may be damaged by excess, too little, or a fluctuation in water.

At block 806, the parametric engine 180 may calculate the likelihood of a trigger for a parametric event activating based upon the predicted total water fluctuation. In some embodiments, the parametric engine 180 implements block 806 as part of or in place of block 604 of FIG. 6. Depending on the embodiment, the trigger for the parametric event activating may be a trigger related to water volume, water chemical composition, general water composition, etc. For example, the trigger may be a pond depth increasing by 2 inches. As another example, the trigger may be the detection and/or calculation of a reduced alkalinity of a pool or the detection and/or determination that dangerous objects have fallen into the pool.

Depending on the embodiment, the parametric engine 180 may calculate the likelihood of the trigger for the parametric event activating using a machine learning model. Similarly, the parametric engine 180 may train the machine learning model using training data and/or real world data. In some embodiments, the parametric engine 180 may use and/or train the machine learning model as described herein with regard to FIGS. 1, 6, and 7.

In further embodiments, at least part of the method 800 may occur substantially simultaneously with at least part of the method 600 as described above. For example, the parametric engine 180 may implement blocks 806 as part of and/or in conjunction with block 604 of FIG. 6. In some such embodiments, the parametric engine 180 may continue with the remainder of method 600 after completing method 800 as described above.

In some embodiments, the parametric engine 180 may additionally or alternatively perform methods 600, 700, and/or 800 from a retrospective perspective. As such, in some such embodiments, the parametric engine 180 additionally or alternatively determines that a trigger event has already activated and performs the remainder of the method(s) as applicable. For example, with regard to the method 600, the parametric engine 180 may determine that a trigger event has activated, determine the amount of damage incurred by the user based upon the weather data and/or additional data as provided by the user, and subsequently offer a discount based upon unused value in the policy. As such, although the Figures depict a forward-looking analysis by the parametric engine 180, it will be understood that the parametric engine 180 may additionally or alternatively perform an analysis after the fact as well.

Additional Considerations

It will be understood that the above disclosure is one example and does not necessarily describe every possible implementation. As such, it will be further understood that alternate embodiments may include fewer, alternate, and/or additional steps or elements.

With the foregoing, a user may opt-in to a rewards, insurance discount, or other type of program. After the insurance customer provides their affirmative consent, an insurance provider remote server may collect data from the user's mobile device, vehicle, smart home, wearables, smart glasses, or other smart devices—such as with the customer's permission or affirmative consent. The data collected may be related to weather data, accident data, parametric event data, and/or insured assets before (and/or after) an insurance-related parametric event, including those events discussed elsewhere herein. In return, risk averse insureds, property owners, and/or individuals vulnerable to weather-related parametric events may receive discounts or insurance cost savings related to personal articles, property, and other types of insurance from the insurance provider.

In one aspect, weather data, parametric event data, accident data, and/or other data, including the types of data discussed elsewhere herein, may be collected or received by an insurance provider remote server, such as via direct or indirect wireless communication or data transmission from a weather unit, mobile device, or other user computing device, after a user affirmatively consents or otherwise opts-in to an insurance discount, reward, or other program. The insurance provider may then analyze the data received with the user's permission to provide benefits to the customer as described herein. As a result, risk averse customers may receive insurance discounts or other insurance cost savings based upon data that reflects low risk behavior and/or technology that mitigates or prevents risk to (i) insured assets, such as homes, personal belongings, or property, or (ii) users.

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or In addition, use of "a" or "an" is employed to describe elements and components of the embodiments herein. This is done merely for convenience and to give a general sense of the invention. This description should be read to include one or at least one and the singular also may include the plural unless it is obvious that it is meant otherwise.

Upon reading this disclosure, those of skill in the art will appreciate still additional alternative structural and functional designs for providing feedback to members of the zero-trust index mutual aid, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A computer-implemented method for performing analysis of parametric events, the computer-implemented method comprising:

receiving, by one or more processors via a distributed ledger, unstructured weather data from a weather oracle network;

measuring, by the one or more processors, an initial water chemical composition for a body of water via one or more water sensors associated with the body of water;

calculating, by the one or more processors and using a first trained machine learning algorithm, a likelihood of a trigger activation for a parametric event for a user based at least upon the unstructured weather data, wherein the calculating includes:

predicting, by the one or more processors, an amount of precipitation for a time period associated with the parametric event based at least upon the unstructured weather data, predicting, by the one or more processors, a total water chemical composition fluctuation for the body of water based upon the amount of precipitation using the first trained machine learning algorithm, wherein the first trained machine learning algorithm is trained in accordance with historical data indicative of historical chemical composition fluctuation with corresponding historical amounts of precipitation, calculating, by the one or more processors, a predicted water chemical composition change from the initial water chemical composition for the body of water based upon the total water chemical composition fluctuation, and calculating, by the one or more processors, the likelihood of the trigger activation, wherein the trigger activation occurs when the predicted water chemical composition change from the initial water chemical composition for the body of water reaches a predetermined threshold proportion of a predetermined chemical;

calculating, by the one or more processors and using a second trained machine learning algorithm, an estimated loss for the user based at least upon the likelihood of the trigger activation;

determining, by the one or more processors, an initial coverage for the user; and determining, by the one or more processors, whether to offer the user updated coverage for the parametric event based at least upon a comparison of the initial coverage and the estimated loss for the user.

2. The computer-implemented method of claim 1, further comprising:

receiving confirmation data associated with the parametric event;

authenticating, based at least upon the confirmation data, that the user suffered a loss associated with the parametric event; and causing the user to receive a payment in accordance with at least one of the initial coverage or the updated coverage.

3. The computer-implemented method of claim 1, further comprising:

extracting the unstructured weather data; and analyzing the unstructured weather data using natural language processing (NLP).

4. The computer-implemented method of claim 1, further comprising:

receiving updated weather data from one or more smart devices located at a location of the parametric event; and determining an updated estimated loss based at least on the estimated loss and the updated weather data;

wherein the determining whether to offer the user the updated coverage is further based upon the updated estimated loss.

5. The computer-implemented method of claim 1, wherein the updated coverage includes at least one of: (i) a discount on the initial coverage; (ii) an increase in value of the initial coverage; or (iii) an increase in scope of the initial coverage.

6. The computer-implemented method of claim 1, wherein the receiving the unstructured weather data further comprises receiving the unstructured weather data from at least one of: (i) a synthetic aperture radar or (ii) user comment databases.

7. A computing system for performing analysis of parametric events, the computing system comprising:

a memory storing a set of computer-executable instructions; and one or more processors interfacing with the memory, and configured to execute the set of computer-executable instructions to cause the one or more processors to:

receive, via a distributed ledger, unstructured weather data from a weather oracle network, measure an initial water chemical composition for a body of water via one or more water sensors associated with the body of water;

calculate, using a first trained machine learning algorithm, a likelihood of a trigger activation for a parametric event for a user based at least upon the unstructured weather data, wherein calculating the likelihood of the trigger activation includes:

predicting an amount of precipitation for a time period associated with the parametric event based at least upon the unstructured weather data, predicting a total water chemical composition fluctuation for the body of water based upon the amount of precipitation using the first trained machine learning algorithm, wherein the first trained machine learning algorithm is trained in accordance with historical data indicative of historical chemical composition fluctuation with corresponding historical amounts of precipitation, calculating a predicted water chemical composition change from the initial water chemical composition for the body of water based upon the total water chemical composition fluctuation, and calculating the likelihood of the trigger activation, wherein the trigger activation occurs when the predicted water chemical composition change from the initial water chemical composition for the body of water reaches a predetermined threshold proportion of a predetermined chemical, calculate, using a second trained machine learning algorithm, an estimated loss for the user based at least upon the likelihood of the trigger activation, determine an initial coverage for the user, and determine whether to offer the user updated coverage for the parametric event based at least upon a comparison of the initial coverage and the estimated loss for the user.

8. The computing system of claim 7, wherein the memory further stores instructions that, when executed by the one or more processors, cause the one or more processors to:

receive confirmation data associated with the parametric event;

authenticate, based at least upon the confirmation data, that the user suffered a loss associated with the parametric event; and cause the user to receive a payment in accordance with at least one of the initial coverage or the updated coverage.

9. The computing system of claim 7, wherein the memory further stores instructions that, when executed by the one or more processors, cause the one or more processors to:

extract the unstructured weather data; and analyze the unstructured weather data using natural language processing (NLP).

10. The computing system of claim 7, wherein the memory further stores instructions that, when executed by the one or more processors, cause the one or more processors to:

receive updated weather data from one or more smart devices located at a location of the parametric event; and determine an updated estimated loss based at least on the estimated loss and the updated weather data;

wherein determining whether to offer the user the updated coverage is further based upon the updated estimated loss.

11. The computing system of claim 7, wherein the updated coverage includes at least one of: (i) a discount on the initial coverage; (ii) an increase in value of the initial coverage; or (iii) an increase in scope of the initial coverage.

12. The computing system of claim 7, wherein receiving the unstructured weather data further comprises receiving the unstructured weather data from at least one of: (i) a synthetic aperture radar or (ii) user comment databases.

13. A tangible, non-transitory computer-readable medium storing instructions for performing analysis of parametric events that, when executed by one or more processors of a computing device, cause the one or more processors to:
receive, via a distributed ledger, unstructured weather data from a weather oracle network,
measure an initial water chemical composition for a body of water via one or more water sensors associated with the body of water;
calculate, using a first trained machine learning algorithm, a likelihood of a trigger activation for a parametric event for a user based at least upon the unstructured weather data, wherein calculating the likelihood of the trigger activation includes:
predicting an amount of precipitation for a time period associated with the parametric event based at least upon the unstructured weather data,
predicting a total water chemical composition fluctuation for the body of water based upon the amount of precipitation using the first trained machine learning algorithm, wherein the first trained machine learning algorithm is trained in accordance with historical data indicative of historical chemical composition fluctuation with corresponding historical amounts of precipitation,
calculating a predicted water chemical composition change from the initial water chemical composition for the body of water based upon the total water chemical composition fluctuation, and
calculating the likelihood of the trigger activation, wherein the trigger activation occurs when the predicted water chemical composition change from the initial water chemical composition for the body of water reaches a predetermined threshold proportion of a predetermined chemical,
calculate, using a second trained machine learning algorithm, an estimated loss for the user based at least upon the likelihood of the trigger activation,
determine an initial coverage for the user, and
determine whether to offer the user updated coverage for the parametric event based at least upon a comparison of the initial coverage and the estimated loss for the user.

14. The tangible, non-transitory computer-readable medium of claim 13, wherein the tangible, non-transitory computer-readable medium further includes instructions that, when executed by the one or more processors, cause the one or more processors to:
receive confirmation data associated with the parametric event;
authenticate, based at least upon the confirmation data, that the user suffered a loss associated with the parametric event; and
cause the user to receive a payment in accordance with at least one of the initial coverage or the updated coverage.

15. The tangible, non-transitory computer-readable medium of claim 13, wherein the tangible, non-transitory computer-readable medium further includes instructions that, when executed by the one or more processors, cause the one or more processors to:
extract the unstructured weather data; and
analyze the unstructured weather data using natural language processing (NLP).

16. The tangible, non-transitory computer-readable medium of claim 13, wherein the tangible, non-transitory computer-readable medium further includes instructions that, when executed by the one or more processors, cause the one or more processors to:
receive updated weather data from one or more smart devices located at a location of the parametric event; and
determine an updated estimated loss based at least on the estimated loss and the updated weather data;
wherein determining whether to offer the user the updated coverage is further based upon the updated estimated loss.

17. The tangible, non-transitory computer-readable medium of claim 13, wherein the updated coverage includes at least one of: (i) a discount on the initial coverage; (ii) an increase in value of the initial coverage; or (iii) an increase in scope of the initial coverage.

18. The tangible, non-transitory computer-readable medium of claim 13, wherein receiving the unstructured weather data further comprises receiving the unstructured weather data from at least one of: (i) a synthetic aperture radar or (ii) user comment databases.

* * * * *